(12) United States Patent
Rhodes et al.

(10) Patent No.: US 12,045,986 B2
(45) Date of Patent: Jul. 23, 2024

(54) METHODS, APPARATUS, AND ARTICLES OF MANUFACTURE FOR INTERACTIVE IMAGE SEGMENTATION

(71) Applicant: Intel Corporation, Santa Clara, CA (US)

(72) Inventors: Anthony Rhodes, Portland, OR (US); Manan Goel, Portland, OR (US); Ke Ding, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 17/131,525

(22) Filed: Dec. 22, 2020

(65) Prior Publication Data

US 2021/0110198 A1 Apr. 15, 2021

(51) Int. Cl.
*G06T 7/00* (2017.01)
*G06F 18/20* (2023.01)
(Continued)

(52) U.S. Cl.
CPC .............. *G06T 7/11* (2017.01); *G06F 18/285* (2023.01); *G06N 3/045* (2023.01); *G06T 7/10* (2017.01);
(Continued)

(58) Field of Classification Search
CPC ........ G06T 7/10–7/194; G06N 3/0464; G06V 10/70; G06V 10/778–10/7796; G06V 10/82; G06V 10/454
See application file for complete search history.

(56) References Cited

U.S. PATENT DOCUMENTS

2020/0026928 A1 1/2020 Rhodes et al.
2020/0160528 A1 5/2020 Rhodes et al.

OTHER PUBLICATIONS

He et al., "Hybrid Dilated Convolution Network Using Attentive Kernels for Real-Time Semantic Segmentation", Part of the Lecture Notes in Computer Science book series (LNIP,vol. 12305), Chinese Conference on Pattern Recognition and Computer Vision (PRCV), PRCV 2020: Pattern Recognition and Computer Vision (PRCV), Prcv 2020: Pattern Recognition and Computer Vision, published Oct. 11, 2020, 2 bib pages and article pp. 129-141. (Year: 2020).*

(Continued)

*Primary Examiner* — Brian Werner
(74) *Attorney, Agent, or Firm* — HANLEY, FLIGHT & ZIMMERMAN, LLC

(57) ABSTRACT

Methods, apparatus, systems, and articles of manufacture are disclosed for interactive image segmentation. An example apparatus includes an inception controller to execute an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input; an atrous controller to execute an atrous sublayer of the CNN, the atrous sublayer including two or more atrous convolutions including respective kernels of varying sizes to generate multi-scale atrous features; and a collation controller to execute a collation sublayer of the CNN to collate the multi-scale inception features, the multi-scale atrous features, and eidetic memory features.

25 Claims, 10 Drawing Sheets

(51) Int. Cl.
    *G06N 3/045*      (2023.01)
    *G06T 7/10*      (2017.01)
    *G06T 7/11*      (2017.01)
    *G06V 10/44*      (2022.01)
    *G06V 10/764*      (2022.01)
    *G06V 10/82*      (2022.01)

(52) U.S. Cl.
    CPC .......... *G06V 10/454* (2022.01); *G06V 10/764* (2022.01); *G06V 10/82* (2022.01)

(56) References Cited

OTHER PUBLICATIONS

Chen et al., "DeepLab: Semantic Image Segmentation with Deep Convolutional Nets, Atrous Convolution, and Fully Connected CRFs," arXiv:1606.00915v2 [cs.CV], May 12, 2017 (14 pages).

Szegedy et al., "Going deeper with convolutions," arXiv:1409.4842v1 [cs.CV], Sep. 17, 2014 (12 pages).

Li et al., "Interactive Image Segmentation with Latent Diversity," 2018 IEEE/CVF Conference on Computer Vision and Pattern Recognition, Salt Lake City, UT, USA, 2018, pp. 577-585, doi: 10.1109/CVPR.2018.00067 (9 pages).

Luo et al., "Neural Architecture Optimization," 32nd Conference on Neural Information Processing Systems (NeurIPS 2018), Montréal, Canada, 2018 (12 pages).

He et al., "Deep Residual Learning for Image Recognition," arXiv:1512.03385v1 [cs.CV], Dec. 10, 2015 (12 pages).

Hu et al., "Squeeze-and-Excitation Networks," arXiv:1709.01507v4 [cs.CV], May 16, 2019 (13 pages).

Simonyan et al., "Very Deep Convolutional Networks for Large-Scale Image Recognition," arXiv:1409.1556v6 [cs.CV], Published as a conference paper at ICLR 2015, Apr. 10, 2015 (14 pages).

Lenczner et al., "DISIR: Deep Image Segmentation With Interactive Refinement," Université Paris-Saclay, arXiv:2003..14200v2 [cs.CV], Published as a conference paper at ONERA 2020, Aug. 20, 2020 (8 pages).

Yuan et al. "Multi Receptive Field Network for Semantic Segmentation," Samsung Research China Beijing, arXiv:2011.08577v1 [cs.CV], Nov. 17, 2020 (10 pages).

European Patent Office, "Extended European Search Report", issued in connection with European Patent Application No. 21196475.4, Mar. 25, 2022, (12 pages).

Christian Szegedy et al., "Going deeper with convolutions," arXiv:1409.4842v1 [cs.CV] Sep. 17, 2014 (12 pages).

Jie Hu et al., "Squeeze-and-Excitation Networks," arXiv:1709.01507v4 [cs.CV] May 19, 2019 (13 pages).

Yibo Yang et al., "Convolutional Neural Networks with Alternately Updated Clique," arXiv:1802.10419v3 [cs.CV] Apr. 3, 2018 (10 pages).

Fabricio Breve, "Interactive Image Segmentation using Label Propagation through Complex Networks," Institute of Geosciences and Exact Sciences, Sao Paulo State University (UNESP), Rio Claro, SP, 13506-900, Brazil, arXiv:1901.02573v1 [cs.CV] Jan. 9, 2019 (43 pages).

Jason Brownlee, "A Gentle Introduction to 1×1 Convolutions to Manage Model Complexity," Machine Learning Mastery, Apr. 29, 2019, last updated Jul. 5, 2019 (23 pages).

Paul-Louis Pröve, "An Introduction to Different Types of Convolutions in Deep Learning," Towards Data Science, Jul. 22, 2017 (12 pages).

Kaiming He et al., "Deep Residual Learning for Image Recognition," 2016 IEEE Conference on Computer Vision and Pattern Recognition (CVPR), Las Vegas, NV, USA, 2016, pp. 770-778, doi: 10.1109/CVPR.2016.90. (9 pages).

Anthony D. Rhodes and Manan Goel, "High Fidelity Interactive Video Segmentation Using Tensor Decomposition, Boundary Loss, Convolutional Tessellations, and Context-Aware Skip Connections," In European Conference on Visual Media Production (CVMP '20), Association for Computing Machinery, New York, NY, USA, Article 1, 1-8. DOI: https://doi.org/10.1145/3429341.3429341, Nov. 23, 2020 (9 pages).

MissingLink.ai, "Image Segmentation in Deep Learning: Methods and Applications," last retrieved Dec. 10, 2020, available online: https://missinglink.ai/guides/computer-vision/image-segmentation-deep-learning-methods-applications/#:~:text=The main deep learning architecture, VGG%2C Inception%2C and ResNet. (16 pages).

Zhuwen Li et al., "Interactive Image Segmentation with Latent Diversity," 2018 IEEE/CVF Conference on Computer Vision and Pattern Recognition, Salt Lake City, UT, USA, 2018, pp. 577-585, doi: 10.1109/CVPR.2018.00067 (9 pages).

Pinheiro, Pedro & Collobert, Ronan, "From Image-level to Pixel-level Labeling with Convolutional Networks," 2015, 1713-1721. 10.1109/CVPR.2015.7298780 (9 pages).

Andrew Tch, "The mostly complete chart of Neural Networks, explained," Towards Data Science, Aug. 4, 2017 (42 pages).

Wenjie Luo et al., "Understanding the Effective Receptive Field in Deep Convolutional Neural Networks," 30th International Conference on Neural Information Processing Systems (NIPS 2016), Barcelona, Spain, Dec. 2016 (9 pages).

Panqu Wang et al., "Understanding Convolution for Semantic Segmentation," arXiv:1702.08502v1 [cs.CV] Feb. 27, 2017 (11 pages).

\* cited by examiner

METHODS, APPARATUS, AND ARTICLES OF MANUFACTURE FOR INTERACTIVE IMAGE SEGMENTATION

FIELD OF THE DISCLOSURE

This disclosure relates generally to artificial intelligence, and, more particularly, to methods, apparatus, and articles of manufacture for interactive image segmentation.

BACKGROUND

Machine learning models, such as neural networks, are useful tools that have demonstrated their value solving complex problems regarding object detection, pattern recognition, natural language processing, automatic speech recognition, etc. Neural networks operate, for example, using artificial neurons arranged into layers that process data from an input layer to an output layer, applying weighting values to the data during the processing of the data. Such weighting values are determined during a training process.

Figure 1:
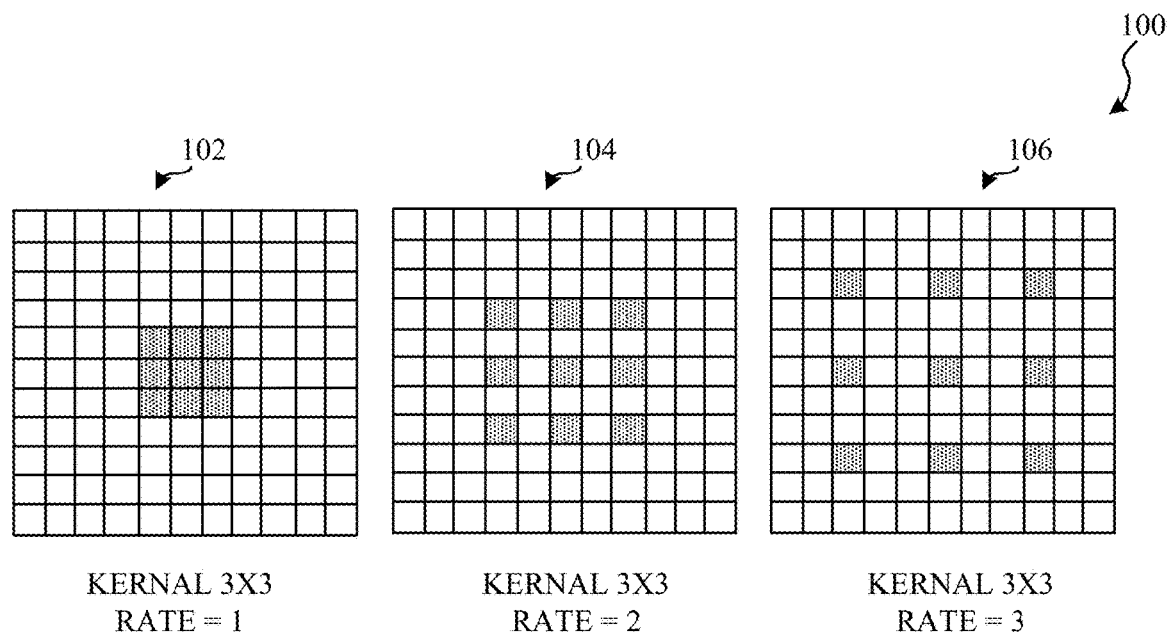
FIG. 1 is a graphical illustration showing example atrous convolutions.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labeling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Once training is complete, the model is deployed for use as an executable construct that processes an input and provides an output based on the network of nodes and connections defined in the model. Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

ML/AI models have been applied to improve many areas of technology including digital image processing. Digital image processing tasks typically utilize convolutional neural networks (CNNs), although additional or alternative ML/AI models may be used. Image segmentation is one example of a digital image processing operation that is aided by ML/AI models. Image segmentation involves partitioning digital images into multiple segments (e.g., sets of pixels, sometimes referred to as image objects). In some examples, image segmentation is performed to convert a raw image into a format that is more meaningful to and/or easier to analyze with a machine. Image segmentation processes label pixels in an image such that those pixels with the same label share similar characteristics. For example, image segmentation processes locate objects within an image and/or boundaries of entities (e.g., objects, spaces, etc.) within the image.

Image segmentation has many applications including content-based image retrieval, machine vision (e.g., computer vision), medical imaging (e.g., volume rendered images from computer tomography and magnetic resonance imaging), object detection (e.g., pedestrian detection, face detection, brake light detection, object location in satellite images, etc.), recognition tasks (e.g., face recognition, fingerprint recognition, iris recognition, etc.), traffic control systems, video surveillance, video object co-segmentation and action localization, among others. As described above, digital image processing operations, such as image segmentation, often utilize CNNs.

CNNs include an input layer, an output layer, and multiple hidden layers. The hidden layers of a CNN include one or more convolutional layers, one or more rectified liner unit (ReLU) layers, one or more pooling layers, one or more fully connected layers, and/or one or more normalization layers. The input to CNNs are tensors (e.g., a multidimensional array) specifying the number of images in a dataset, the height of the images, the width of the images, and the depth of the images (e.g., the number of bits specifying the color of a pixel in the image). The convolutional layers of CNNs abstract the input images to a feature map that is represented by a tensor specifying the number of images, the feature map height, the feature map width, and the feature map channels (e.g., red, green, blue images include three channels).

Convolutional layers include convolution kernels (sometimes referred to as filters) and a number of input and output channels. In CNNs, the size of the kernel (e.g., height and width) may be thought of as the field of view of the convolution. To increase the field of view of convolutions, some CNNs implement atrous convolutions (sometimes referred to as dilated convolutions). Atrous convolutions also reduce or maintain the number of convolutions and/or kernel size needed in a CNN to obtain a desired result. Atrous convolutions were introduced to aid in image segmentation, a pixel level processing task (e.g., object outlining). On the other hand, inception convolutions are typically applied for separate tasks, picture level processing tasks (e.g., image classification).

FIG. 1 is a graphical illustration 100 showing example atrous convolutions 102, 104, and 106. Atrous convolutions differ from traditional convolutions in CNNs insofar as atrous convolutions include a dilation operation that is applied to a kernel (e.g., 3×3 or 5×5 kernel) of the convolution prior to the application of kernel to an input (e.g., an input datum).

In the example of FIG. 1, each atrous convolution 102, 104, 106 includes a kernel size and a dilation rate. For example, the first atrous convolution 102 includes a kernel size of 3×3 and a dilation rate of one. A dilation rate of one corresponds to a tradition convolution. The second atrous convolution 104 includes a kernel size of 3×3 and a dilation rate of two. Atrous convolutions are common in service-oriented architecture (SOA) CNNs.

In the illustrated example of FIG. 1, the first atrous convolution 102 includes a kernel size of 3×3 and a dilation rate of one. For example, a dilation rate of one corresponds to a tradition convolution. In the example of FIG. 1, the second atrous convolution 104 includes a kernel size of 3×3 and a dilation rate of two. With a 3×3 kernel size and dilation rate of two, the second atrous convolution 104 is comparable to a tradition convolution with a kernel size of 5×5. In the example of FIG. 1, the third atrous convolution 106 includes a kernel size of 3×3 and a dilation rate of three. With a 3×3 kernel size and dilation rate of three, the third atrous convolution 106 is comparable to a tradition convolution with a kernel size of 7×7.

As described above, an advantage of atrous convolutions is that the receptive field (e.g., field of view of correlated input image pixels) of CNNs implementing atrous convolutions increases (e.g., grows) while fixing the number of parameters needed for a desired outcome (e.g., the kernel size is still 3×3). For example, each of the first atrous convolution 102, the second atrous convolution 104, and the third atrous convolution 106 includes nine parameters (e.g., the shaded regions of the grids). Conversely, comparable tradition convolutions (e.g., 3×3, 5×5, and 7×7 sized kernels, respectively) include nine, 25, and 49 parameters, respectively.

Mathematically, an atrous convolution in one dimension can be defined according to equation 1, below:

$$y[i] = \sum_{k=1}^{K} x[i + r \cdot k] w[k] \quad \text{Equation 1}$$

In the example of equation 1, y[i] denotes the output of the one dimensional atrous convolution for an input signal, x[i], with respect to a kernel, w[k], of length K. For example, K can be any integer natural number such as, 1, 2, 3, 4, 5, 6, etc. The dilation rate parameter of the atrous convolution of equation 1 is denoted by r and operates as described above. For example, when r equals one, the atrous convolution definition generalizes to a standard convolution operation.

Many fully atrous CNNs exist in research and commercial domains, however, these atrous CNNs include at least two significant issues. For example, typical atrous CNNs suffer from a gridding problem (discussed in connection with FIG. 2) that results from sequential atrous convolutions. Additionally, calibrating the effective receptive field of view of typical atrous CNNs proves problematic.

Figure 2:
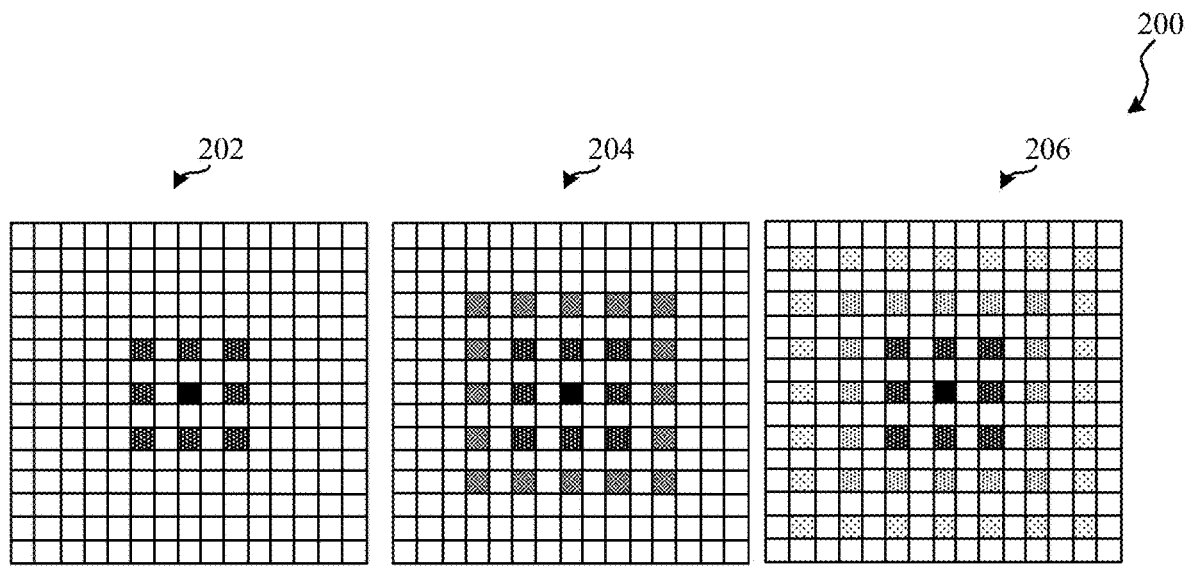
FIG. 2 is a graphical illustration showing an example problem associated with sequential atrous convolutions.

FIG. 2 is a graphical illustration 200 showing an example problem associated with sequential atrous convolutions 202, 204, and 206. The graphical illustration 200 illustrates the gridding problem which presents significant drawbacks. Gridding occurs when atrous convolutions are applied in sequence. By applying atrous convolutions in sequence, atrous CNNs efficiently increase (e.g., grow) the receptive field of view of the atrous CNN while using a reduced (e.g., minimum) number of parameters. In this manner, the atrous CNN effectively "sees" larger objects and learns useful statistical correlations between distance pixels. However, sequential atrous convolutions renders a grid-like, sparse signal, that exacerbates information loss in the atrous CNN.

In the illustrated example of FIG. 2, as an atrous CNN applies atrous convolutions 202, 204, and 206, the data representing the input (e.g., an image) decreases as the atrous CNN recognizes more of the input. For high-fidelity vision problems, such as pixel-level segmentation, this signal sparsity degrades the output of the atrous CNN, and the grid pattern is even directly visible in segmentation applications.

Contrary to typical atrous CNNs, examples disclosed herein include example deep CNN architectures including one or more IAC layers. As used herein, a deep model refers to a machine learning model that includes a relatively greater number of layers (e.g., hundreds, thousands, etc.). As used herein, a shallow model refers to a machine learning model that includes a relatively fewer number of layers (e.g., a relatively small number of layers, shallow, etc.). Examples disclosed herein include substantial and generalizable (e.g., widely applicable) architectural improvements to CNN-based image processing tasks.

For example, the example CNN architecture disclosed herein provides improvement to the high-fidelity problem of interactive image (e.g., object) segmentation. Image (e.g., object) segmentation is an inherently complex task that has been explored since the inception of computer vision. Early image segmentation techniques relied on the use of hand-crafted (e.g., human crafted) features and distance metrics. Recently, CNNs have become the standard model for representing prior knowledge related to object appearances which is utilized in image segmentation. Interactive image segmentation includes applying user input (e.g. positive (within an object of interest) and negative (outside the object of interest) clicks, approximate segmentations) to automatically render a pixel-level segmentation of an object of interest in an image. Example IAC layers disclosed herein improve SOA CNNs for interactive image segmentation.

Examples disclosed herein address challenges for deep CNN architectures. Example CNN architectures disclosed herein obviate the gridding problem and improve (e.g., optimize) the effective receptive field (ERF) of CNNs. For example, examples disclosed herein include a dynamic, multi-scale combination of atrous and standard convolution operations. Additionally, examples disclosed herein collate (e.g., via 1×1 compression) multi-scale features with a collation sublayer. Examples disclosed herein also repurpose context features via a skip connection between IAC layers to reduce the instances of feature dilution for deep CNNs.

Although examples disclosed herein are described with respect to interactive image segmentation, examples disclosed herein are generalizable and can be applied to any CNN-based architecture, regardless of the intended use-case (e.g., classification, video interpolation, generative adversarial networks (GANs), auto encoders (AEs), etc.). For example, the disclosed CNN architecture can be applied to automate the task of rotoscoping, the process of transferring an image into another video sequence, for graphics effects workflows. Additionally, examples disclosed herein can be incorporated in medical imaging applications.

Examples disclosed herein dynamically combine inception and atrous convolution kernels. As such, examples disclosed herein address the gridding problem and appropriately calibrate the ERF of CNNs. For example, the example IAC layers disclosed herein an inception sublayer that efficiently and dynamically combines inception convolution kernels of varying sizes, an atrous sublayer that dynamically combines atrous convolution kernels of varying sizes, and a collation sublayer that aggregates the multi-scale convolution activations, multi-scale atrous activations, and context features (e.g., input features including, in the case of interactive segmentation, user feedback). The output of each sublayer is processed by a feature embedding sublayer before passing to the next sublayer to further improve information flow through the IAC layer.

Figure 3:
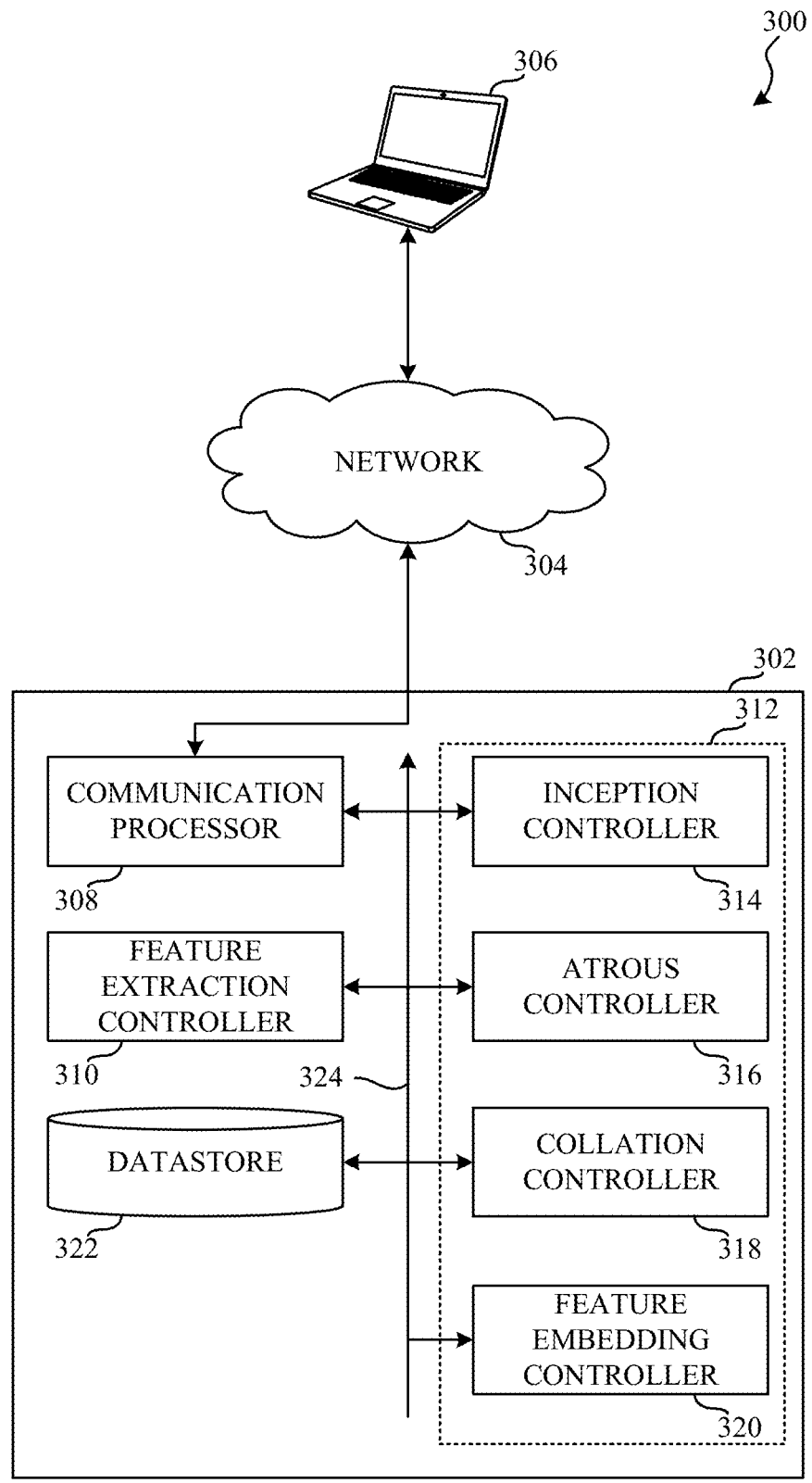
FIG. 3 is a block diagram of an example network diagram including an example interactive segmentation engine.

FIG. 3 is a block diagram of an example network diagram 300 including an example interactive segmentation engine 302. The example network diagram 300 includes the example interactive segmentation engine 302, an example network 304, and an example end-user device 306. In the example of FIG. 3, the example interactive segmentation engine 302, the example end-user device 306, and/or one or more additional devices are communicatively coupled via the example network 304.

In the illustrated example of FIG. 3, the interactive segmentation engine 302 is implemented by one or more controllers. In additional or alternative examples, the interactive segmentation engine 302 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In the example of FIG. 3, the interactive segmentation engine 302 is one or more controllers that implement a deep CNN including one or more IAC layers to dynamically interleave inception convolution operations of varying sizes with atrous convolutions of varying sizes and collate the resulting features with context-based skip connections. Accordingly, the interactive segmentation engine 302 prevents the gridding problem. For example, by allowing for network paths of a deep CNN (and/or other network) executed by the interactive segmentation engine 302 that increase the receptive field of the deep CNN and densely populating the sparse signal created by sequential atrous convolutions, the interactive segmentation engine 302 supplements the parameters missing from sequential atrous convolutions, avoiding the gridding problem. Additional detail of the interactive segmentation engine 302 is discussed further herein.

In the illustrated example of FIG. 3, the interactive segmentation engine 302 offers one or more services and/or products to end-users. For example, the interactive segmentation engine 302 provides one or more trained models for download, host a web-interface, among others. In some examples, the interactive segmentation engine 302 provides end-users with a plugin that implements the interactive segmentation engine 302. In this manner, the end-user can implement the interactive segmentation engine 302 locally (e.g., at the end-user device 306).

In some examples, the example interactive segmentation engine 302 implements example means for segmenting images. The means for segmenting images is implemented by executable instructions such as that implemented by at least blocks 1202, 1204, 1206, 1208, 1210, 1212, 1214, 1216, 1218, 1220, 1222, 1224, 1226, 1228, 1230, 1232 1234, 1236, 1238, or 1240 of FIG. 12. The executable instructions of blocks 1202, 1204, 1206, 1208, 1210, 1212, 1214, 1216, 1218, 1220, 1222, 1224, 1226, 1228, 1230, 1232 1234, 1236, 1238, or 1240 of FIG. 12 of FIG. 12 may be executed on at least one processor such as the example processor 1312 of FIG. 13. In other examples, the means for segmenting images is implemented by hardware logic, hardware implemented state machines, logic circuitry, and/or any other combination of hardware, software, and/or firmware.

In the illustrated example of FIG. 3, the network 304 is the Internet. However, the example network 304 may be implemented using any suitable wired and/or wireless network(s) including, for example, one or more data buses, one or more Local Area Networks (LANs), one or more wireless LANs, one or more cellular networks, one or more private networks, one or more public networks, etc. In additional or alternative examples, the network 304 is an enterprise network (e.g., within businesses, corporations, etc.), a home network, among others. The example network 304 enables the interactive segmentation engine 302 and the end-user device 306 to communicate. As used herein, the phrase "in communication," including variances thereof (e.g., communicate, communicatively coupled, etc.), encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 3, the end-user device 306 is implemented by a laptop computer. In additional or alternative examples, the end-user device 306 can be implemented by a mobile phone, a tablet computer, a desktop computer, a server, among others, including one or more analog or digital circuit(s), logic circuits, programmable processor(s), programmable controller(s), GPU(s), DSP(s), ASIC(s), PLD(s) and/or FPLD(s). The end-user device 306 can additionally or alternatively be implemented by a CPU, GPU, an accelerator, a heterogeneous system, among others.

In the illustrated example of FIG. 3, the end-user device 306 subscribes to and/or otherwise purchases a product and/or service from the interactive segmentation engine 302 to access one or more machine learning models trained to dynamically interleave inception convolution operations of varying sizes with atrous convolutions of varying sizes and collate the resulting features with context-based skip connections. For example, the end-user device 306 accesses the one or more trained models by downloading the one or more models from the interactive segmentation engine 302, accessing a web-interface hosted by the interactive segmentation engine 302 and/or another device, among other techniques. In some examples, the end-user device 306 installs a plugin to implement a machine learning application. In such an example, the plugin implements the interactive segmentation engine 302.

In additional or alternative examples, a user operating the end-user device 306 may access, with the end-user device 306, an application programming interface (API), graphics user interface (GUI), and/or other interface that displays one or more images. In some examples, the user operating the end-user device 306 may select the one or more images from a directory available at the end-user device 306. In additional or alternative examples, the user operating the end-user device 306 may select the one or more images from an online directory hosted by the interactive segmentation engine 302 and/or another device remote to the end-user device 306 (e.g., in another enclosure). In some examples, the one or more images correspond to one or more distinct images. In additional or alternative examples, the one or more images correspond to a sequence of images (e.g. video).

After the user selects the one or more images from a directory, the user may select and/or click on one or more objects and/or other areas in the one or more images. For example, if the user selects an area within an object, the interactive search engine 302 categorizes that click as a positive click an identifies the object as an object of interest. If the user selects an area outside of the object, the interactive search engine 302 categorizes the click as a negative click.

In some examples, the user operating the end-user device 306 may access the interactive segmentation engine 302 to perform rotoscoping. Rotoscoping includes transferring an image from one image and/or video sequence into another video sequence. For example, rotoscoping is a process performed in graphics effects workflows. In additional or alternative examples, the user operating the end-user device 306 may access the interactive segmentation engine 302 to aid in medical imaging applications.

In the illustrated example of FIG. 3, the interactive segmentation engine 302 includes an example communication processor 308, an example feature extraction controller 310, and an example model executor 312. The example model executor 312 includes an example inception controller 314, an example atrous controller 316, an example collation controller 318, and an example feature embedding controller 320. The interactive segmentation engine 302 additionally includes an example datastore 322. In the example of FIG. 3, any of the communication processor 308, the feature extraction controller 310, the model executor 312, the inception controller 314, the atrous controller 316, the collation controller 318, the feature embedding controller 320, and/or the datastore 322 can communicate via an example communication bus 324.

In examples disclosed herein, the communication bus 324 may be implemented using any suitable wired and/or wireless communication. In additional or alternative examples, the communication bus 324 includes software, machine readable instructions, and/or communication protocols by which information is communicated among the communication processor 308, the feature extraction controller 310, the model executor 312, the inception controller 314, the atrous controller 316, the collation controller 318, the feature embedding controller 320, and/or the datastore 322.

In examples disclosed herein, the interactive segmentation engine 302 implements one or more deep CNNs including one or more IAC layers. Many different types of machine learning models and/or machine learning architectures exist. In examples disclosed herein, the interactive segmentation engine 302 implementation a deep CNN including one or more IAC layers to dynamically interleave inception convolution operations of varying sizes with atrous convolutions of varying sizes and collate the resulting features with context-based skip connections. Using a deep CNN model including one or more IAC layers enables the deep CNN to have an increased ERF without sacrificing feature density throughout the deep CNN. In general, machine learning models/architectures that are suitable to use in the example approaches disclosed herein will be deep learning models. However, other types of machine learning models could additionally or alternatively be used such as general CNN models, including graph neural networks, capsule neural networks, and other contemporary architectures.

In the illustrated example of FIG. 3, the communication processor 308 is implemented by a network interface controller. In additional or alternative examples, the communication processor 308 can be implemented by one or more analog or digital circuit(s), logic circuits, programmable processor(s), programmable controller(s), GPU(s), DSP(s), ASIC(s), PLD(s) and/or FPLD(s). The example communication processor 308 functions as a network interface structured to communicate with other devices in the network 304 with a designated physical and data link layer standard (e.g., Ethernet or Wi-Fi). For example, the communication processor 308 can host an API, a GUI, and/or other interface through which a user operating the end-user device 306 can enter information to the interactive segmentation engine 302.

In the illustrated example of FIG. 3, the communication processor 308, in response to selection of one or more images on which to perform interactive segmentation, displays the one or more images. The communication processor 308 additionally or alternatively monitors the interface for one or more selections (e.g., clicks). The communication processor 308 forwards the selections (e.g., user-input) to the feature extraction controller 310. After the interactive segmentation engine 302 has completed image segmentation for the one or more images, the communication processor 308 displays the one or more object segments that were identified based on the selections (e.g., user-input).

In additional or alternative examples, the communication processor 308 determines whether there are additional one or more images on which to perform image segmentation. For example, the communication processor 308 may monitor the end-user device 306 for a threshold period. If the end-user device 306 does not access the interactive segmentation engine 302 during the threshold period, the communication processor 308 causes the interactive segmentation engine 302 to cease operation. For example, the interactive segmentation engine 302 may terminate a session established with the end-user device 306. Additionally or alternatively, the interactive segmentation engine 302 may go to sleep. In such an example, if the end-user device 306 access the interactive segmentation engine 302 while the interactive segmentation engine 302 is asleep, the communication processor 308 will cause the interactive segmentation engine 302 to wake up and resume operation.

In some examples, the communication processor 308 implements example means for processing communications. The means for processing communications is implemented by executable instructions such as that implemented by at least blocks 1202, 1204, 1238, and 1240 of FIG. 12. The executable instructions of blocks 1202, 1204, 1238, and 1240 of FIG. 12 may be executed on at least one processor such as the example processor 1312 of FIG. 13. In other examples, the means for processing communications is implemented by hardware logic, hardware implemented state machines, logic circuitry, and/or any other combination of hardware, software, and/or firmware.

In the illustrated example of FIG. 3, the feature extraction controller 310 is implemented by one or more controllers. In additional or alternative examples, the feature extraction controller 310 can be implemented by one or more analog or digital circuit(s), logic circuits, programmable processor(s), programmable controller(s), GPU(s), DSP(s), ASIC(s), PLD(s) and/or FPLD(s). The example feature extraction controller 310 extracts and/or otherwise generates one or more input feature matrices including one or more context features and/or one or more hyper-columns. In the illustrated example of FIG. 3, the feature extraction controller 310 generates context features based on the selections (e.g., user-input). For example, for clicks, the feature extraction controller 310 generates click features which identify the pixels within a threshold distance of the click epicenter (e.g., within a circle the radius of which is equal to the threshold) and applies a gradient to the pixels within the threshold distance. For positive clicks, the gradient indicates that the closer the pixel is to the click, the more likely the pixel is positive (e.g., within an object of interests). For negative clicks, the gradient indicates that the closer the pixel is to the click, the more likely the pixel is negative (e.g., outside the object of interests). Generally, the click features correspond to one or more selections in an image to be processed, the one or more selections identifying one or more pixels within a threshold distance of one or more respective selection epicenters and a corresponding respective gradient specifying a likelihood that the one or more pixels are within the threshold distance.

In the illustrated example of FIG. 3, the feature extraction controller 310 generates one or more context features. Context features include a current image of the one or more images (e.g., a current video frame of an input video), a previous image of the one or more images (e.g., a previous video frame of the input video), a motion frame (e.g., indicating the direction of motion between frames), a previous object segment, positive click features, negative click features, a distance to object of interest indicator frame, and/or a distance to background indicator frame. The feature frames include features compressed from layers of an object classification CNN as applied to the current image (e.g., video frame).

In the illustrated example of FIG. 3, the feature extraction controller 310 generates one or more feature volumes for the one or more images. For example, the feature extraction controller 310 the feature volume may include one or more feature maps that correspond to features or feature values such that, for a pixel, a hyper-column of feature values is provided. The hyper-columns provide a volume of features that are compressed to generate, feature frames. The features volume(s) include per pixel hyper-column deep features. The feature volume(s) are compressed to generate feature frames. Feature frames may have the same resolution as current image (e.g., video frame) (e.g., horizontal and vertical dimensions equal to current video frame) and a depth, D, that is a fraction of the number of entries in each per pixel hyper-column of the feature volume(s).

In some examples, the feature extraction controller 310 implements example means for extracting features. The means for extracting features is implemented by executable instructions such as that implemented by at least block 1206 of FIG. 12. The executable instructions of block 1206 of FIG. 12 may be executed on at least one processor such as the example processor 1312 of FIG. 13. In other examples, the means for extracting features is implemented by hardware logic, hardware implemented state machines, logic circuitry, and/or any other combination of hardware, software, and/or firmware.

In the illustrated example of FIG. 3, the model executor 312 executes one or more deep CNNs including IAC layers. In examples disclosed herein, ML/AI models are trained using standard gradient descent. However, any other training algorithm may additionally or alternatively be used. In examples disclosed herein, training is performed until a target quality metric is satisfied (e.g., until the model(s) segment images with a desired quality). In examples disclosed herein, training is performed at the interactive segmentation engine 302. However, as discussed, in some examples the end-user device 306 may download a plugin and/or other software to facilitate training at the end-user device 306. Training is performed using hyperparameters that control how the learning is performed (e.g., a learning rate, a number of layers to be used in the machine learning model, etc.). In examples disclosed herein, hyperparameters that control the network paths, and feature collations are used. Such hyperparameters are, for example, learned by the model during training in an image-dependent fashion. In some examples re-training may be performed. Such re-training may be performed in response to the model no longer satisfying the target quality metric.

Training is performed using training data. In examples disclosed herein, the training data originates from known challenge sets. For example, the training data may be the ImageNet dataset, the CIFAR-10 dataset, among others. Examples disclosed herein implement supervised learning. Once training is complete, the model is deployed for use as an executable construct that processes an input and provides an output based on the network of nodes and connections defined in the model. The model is stored at the end-user device 306. The model may then be executed by the end-user device 306. In some examples, the model can be stored at the datastore 322 for later deployment.

In some examples, the model executor 312 implements example means executing models. The means for executing models is implemented by executable instructions such as that implemented by at least blocks 1208, 1210, 1212, 1214, 1216, 1218, 1220, 1222, 1224, 1226, 1228, 1230, 1232, 1234, and 1236 of FIG. 12. The executable instructions of blocks 1208, 1210, 1212, 1214, 1216, 1218, 1220, 1222, 1224, 1226, 1228, 1230, 1232, 1234, and 1236 of FIG. 12 may be executed on at least one processor such as the example processor 1312 of FIG. 13. In other examples, the means for executing models is implemented by hardware logic, hardware implemented state machines, logic circuitry, and/or any other combination of hardware, software, and/or firmware.

In the illustrated example of FIG. 3, the inception controller 314 is implemented by one or more controllers. In additional or alternative examples, the inception controller 314 can be implemented by one or more analog or digital circuit(s), logic circuits, programmable processor(s), programmable controller(s), GPU(s), DSP(s), ASIC(s), PLD(s) and/or FPLD(s). In the example of FIG. 3, the inception controller 314 determines whether to skip the inception sublayer of the current IAC layer. For example, the inception controller 314 may determine to skip and/or otherwise bypass the inception sublayer of the current IAC layer if performing inception convolutions would not be advantageous (e.g., the input matrix the inception sublayer is already densely populated). Additionally or alternatively, the inception controller 314 determines to skip and/or otherwise bypass the inception sublayer when one or more atrous convolutions are paramount. For example, for a given input image, it may be advantageous for the network to learn correlations between very distant image pixels but not intermediate pixels (e.g., pixel x and pixel y are both part of the periphery of an object of interest, but densely processing all of the intermediate pixels between them is less important). In some examples, such as for the first IAC layer, the inception controller 314 performs a 1×1 convolution to preserve residual feature data in the input feature matrix and/or matrices to the inception controller 314.

In the illustrated example of FIG. 3, if the inception controller 314 determine to skip the inception sublayer of the current IAC layer, the inception controller 314 performs a convolution on the input matrix and/or matrices with a 1×1 kernel (e.g., a 1×1 convolution) and concatenates the result. In this manner, the inception controller 314 reduces the size of the input matrix and/or matrices to the inception sublayer. Generally, the output of the inception sublayer is referred to as inception features. In some examples, inception features are represented by activation values (sometimes referred to as activations). Alternatively, if the inception controller 314 determines not to skip the inception sublayer of the current IAC layer, the inception controller 314 performs three parallel operations on the input matrix and/or matrices. For example, the inception controller 314 performs a 3×3 maxpooling operation for dimensionality reduction and two 1×1 convolutions.

In such an example, the inception controller 314 processes the outputs of the three parallel operations with another set of three parallel operations. For example, the inception controller 314 performs a 3×3 convolution on the output of the first 1×1 convolution, a 5×5 convolution on the output of the second 1×1 convolution, and a 1×1 convolution on the output of the 3×3 maxpooling operation. The inception controller 314 concatenates the output of the second set of three parallel operations. In this manner, the inception controller 314 generates one or more inception features that form a dense representation of the input image. After processing the input matrix and/or matrices, the inception controller 314 transmits inception features to the feature embedding controller 320.

In some examples, the inception controller 314 implements example means for performing inception convolutions. The means for performing inception convolutions is implemented by executable instructions such as that implemented by at least blocks 1208, 1210, 1212, 1214, and 1216 of FIG. 12. The executable instructions of b blocks 1208, 1210, 1212, 1214, and 1216 of FIG. 12 may be executed on at least one processor such as the example processor 1312 of FIG. 13. In other examples, the means for performing inception convolutions is implemented by hardware logic, hardware implemented state machines, logic circuitry, and/or any other combination of hardware, software, and/or firmware.

In the illustrated example of FIG. 3, the atrous controller 316 is implemented by one or more controllers. In additional or alternative examples, the atrous controller 316 can be implemented by one or more analog or digital circuit(s), logic circuits, programmable processor(s), programmable controller(s), GPU(s), DSP(s), ASIC(s), PLD(s) and/or FPLD(s). In the example of FIG. 3, the atrous controller 316 obtains the embedded inception features from the feature embedding controller 320. Additionally, the atrous controller 316 determines whether to skip the atrous sublayer of the current IAC layer. For example, the atrous controller 316 may determine to skip the inception sublayer of the current IAC layer if the performing atrous convolutions would not be advantageous (e.g., the input matrix the atrous sublayer is sparsely populated, includes several elements with a value of zero, etc.). For example, the atrous controller 316 determines to skip the atrous sublayer of the current IAC layer when the inception controller 314 determines not to skip the inception sublayer. Additionally or alternatively, the atrous controller 316 determines to skip the atrous sublayer when densely processing image pixels in order to generate a contiguous segmentation. For example, skipping the atrous sublayer when densely processing image pixels may be advantageous so that the network can apply a standard convolution and bypass an atrous convolution.

In the illustrated example of FIG. 3, if the atrous controller 316 determine to skip the atrous sublayer of the current IAC layer, the atrous controller 316 performs a 1×1 convolution on the embedded inception features and concatenates the result. In this manner, the atrous controller 316 preserves residual feature data in the embedded inception features. Generally, the output of the atrous sublayer is referred to as atrous features. In some examples, atrous features are represented by activation values (sometimes referred to as activations). Alternatively, if the atrous controller 316 determines not to skip the atrous sublayer of the current IAC layer, the atrous controller 316 performs two parallel operations on the embedded inception features. For example, the atrous controller 316 performs two 1×1 convolutions.

In such an example, the atrous controller 316 processes the outputs of the two parallel operations with another set of two parallel operations. For example, the atrous controller 316 performs a 3×3 atrous convolution on the output of the first 1×1 convolution and a 5×5 atrous convolution on the output of the second 1×1 convolution. The atrous controller 316 concatenates the output of the second set of two parallel operations. In this manner, the atrous controller 316 generates one or more atrous features to expand the effective receptive field of view of the deep CNN. After processing the embedded inception features, the atrous controller 316 transmits atrous features to the feature embedding controller 320.

In some examples, the atrous controller 316 implements example means for performing atrous convolutions. The means for performing atrous convolutions is implemented by executable instructions such as that implemented by at least blocks 1220, 1222, 1224, and 1226 of FIG. 12. The executable instructions of blocks 1220, 1222, 1224, and 1226 of FIG. 12 may be executed on at least one processor such as the example processor 1312 of FIG. 13. In other examples, the means for performing atrous convolutions is implemented by hardware logic, hardware implemented state machines, logic circuitry, and/or any other combination of hardware, software, and/or firmware.

In the illustrated example of FIG. 3, the collation controller 318 is implemented by one or more controllers. In additional or alternative examples, the collation controller 318 can be implemented by one or more analog or digital circuit(s), logic circuits, programmable processor(s), programmable controller(s), GPU(s), DSP(s), ASIC(s), PLD(s) and/or FPLD(s). In the example of FIG. 3, the collation controller 318 obtains the embedded atrous features from the feature embedding controller 320. Additionally, the collation controller 318 combines the multi-scale features generated by the inception controller 314 and the atrous controller 316 as well as eidetic memory features. In the example of FIG. 3, eidetic memory features include context features, the input image, and selections (e.g., positive and/or negative clicks). Generally, the output of the collation controller 318 is referred to as collated features. In some examples, collated features are represented by activation values (sometimes referred to as activations). In this manner, the collation controller 318 fills in holes (e.g., sparse datapoints in the atrous features) in the ERF of the deep CNN with the dense inception features generated by the inception controller 314. After processing the embedded atrous features, the collation controller 318 transmits collated features to the feature embedding controller 320.

Additionally, the collation controller 318 determines whether there are additional IAC layers to be executed. If the collation controller 318 determines that there are additional IAC layers to be executed, the collation controller 318 determines whether to skip the next IAC layer (e.g., the subsequent IAC layer) of the deep CNN. For example, the collation controller 318 may determine to skip the next IAC layer if there are varying dimensions between the input image to the NN and the desired output image. For example, if the depth of the input to the collation controller 318 is 1024 (meaning there are 1024 layers of activations that are in the dimension of the image) and the output image has a depth of 128, the collation controller 318 may elect to skip the next IAC layer to select the best features. Additionally or alternatively, the collation controller 318 determines to skip the next IAC layer if the network is processing a relatively simple object (e.g., an object with a uniform boundary). For example, for simple objects, processing many of the features in previous IAC layers of the network may be unnecessary. If the collation controller 318 determines to skip the next IAC layer, the collation controller 318 instructs the feature embedding controller 320 to return the collated features to the collation controller 318 after being embedded (e.g., as if it were the output of the atrous sublayer in the next IAC layer). Alternatively, if no additional IAC layers are to be executed, the communication processor 308 displays the image segment(s) determined as a result of executing the IAC layer(s).

In some examples, the collation controller 318 implements example means for collating. The means for collating is implemented by executable instructions such as that implemented by at least blocks 1230, 1234, and 1236 of FIG. 12. The executable instructions of blocks 1230, 1234, and 1236 of FIG. 12 may be executed on at least one processor such as the example processor 1312 of FIG. 13. In other examples, the means for collating is implemented by hardware logic, hardware implemented state machines, logic circuitry, and/or any other combination of hardware, software, and/or firmware.

In the illustrated example of FIG. 3, the feature embedding controller 320 is implemented by one or more controllers. In additional or alternative examples, the feature embedding controller 320 can be implemented by one or more analog or digital circuit(s), logic circuits, programmable processor(s), programmable controller(s), GPU(s), DSP(s), ASIC(s), PLD(s) and/or FPLD(s). In the example of FIG. 3, the feature embedding controller 320 obtains the obtains the output of the inception controller 314, the atrous controller 316, and/or the collation controller 318. The feature embedding controller 320 adaptively recalibrates channel-wise feature responses by explicitly modeling inter-dependencies between channels. Additional detail of the feature embedding controller 320 is illustrated and described in connection with FIG. 9.

In some examples, the feature embedding controller 320 implements example means for embedding features. The means for embedding features is implemented by executable instructions such as that implemented by at least blocks 1218, 1228, and 1232 of FIG. 12. The executable instructions of blocks 1218, 1228, and 1232 of FIG. 12 may be executed on at least one processor such as the example processor 1312 of FIG. 13. In other examples, the means for embedding features is implemented by hardware logic, hardware implemented state machines, logic circuitry, and/or any other combination of hardware, software, and/or firmware.

In the illustrated example of FIG. 3, the datastore 322 is configured to store data. For example, the datastore 322 can store one or more files indicative of one or more trained models, one or more IAC layers, one or more features (e.g., inception features, atrous features, collated features, embedded versions thereof, context features, feature volumes, hyper-columns, eidetic memory features), and/or one or more image segments. In the example of FIG. 3, the datastore 322 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The example datastore 322 may additionally or alternatively be implemented by one or more double data rate (DDR) memories, such as DDR, DDR2, DDR3, DDR4, mobile DDR (mDDR), etc.

In additional or alternative examples, the example datastore 322 may be implemented by one or more mass storage devices such as hard disk drive(s), compact disk drive(s), digital versatile disk drive(s), solid-state disk drive(s), etc. While in the illustrated example the datastore 322 is illustrated as a single database, the datastore 322 may be implemented by any number and/or type(s) of databases. Furthermore, the data stored in the datastore 322 may be in any data format such as, for example, binary data, comma delimited data, tab delimited data, structured query language (SQL) structures, etc.

Figure 4:
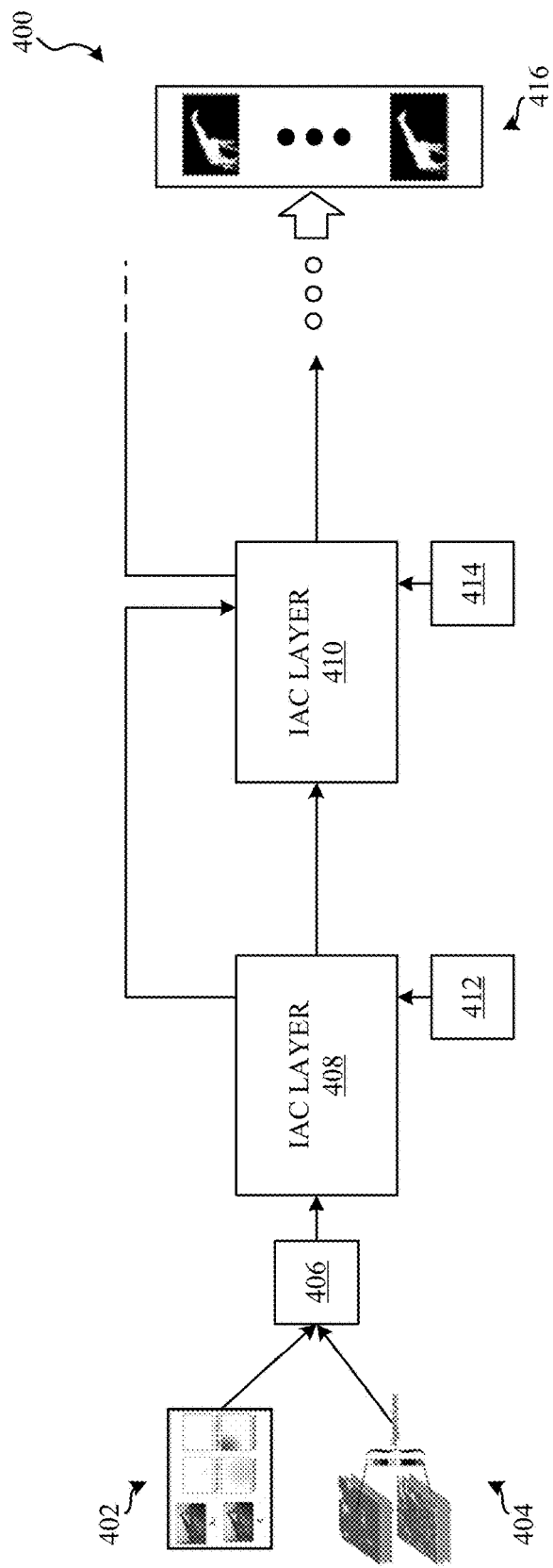
FIG. 4 is a block diagram of an example pixel-level interactive segmentation neural network (NN) executed by the interactive segmentation engine of FIG. 3 including one or more inception-atrous-collation (IAC) layers.

FIG. 4 is a block diagram of an example pixel-level interactive segmentation neural network (NN) 400 executed by the interactive segmentation engine 302 of FIG. 3 including one or more IAC layers. In the example of FIG. 4, the pixel-level interactive segmentation NN 400 processes one or more example context features 402 and one or more example hyper-columns 404. The example pixel-level interactive segmentation NN 400 includes an example reduction layer 406, an example first IAC layer 408, and an example second IAC layer 410. In the example of FIG. 4, while only two IAC layers are illustrated, the pixel-level interactive segmentation NN 400 includes ten IAC layers accounting for roughly nine million model parameters (e.g., activations). In additional or alternative examples, the pixel-level interactive segmentation NN 400 may include different numbers of IAC layers. In some examples, the pixel-level interactive segmentation NN 400 include two or more inception-atrous-collation layers.

In the illustrated example of FIG. 4, the reduction layer 406 receives the one or more context features 402 and the one or more hyper-columns 404. In the example of FIG. 4, the inception controller 314 executes the reduction layer 406. For example, the inception controller 314 executes a 1×1 convolution over the input feature matrices (e.g., 402 and 404) to perform dimensionality reduction of the input feature matrices. The output of the reduction layer 406 is transmitted to the first IAC layer 408.

In the illustrated example of FIG. 4, the first IAC layer 408 receives the output of the reduction layer 406 as well as example eidetic memory features 412. The second IAC layer 410 receives the output of the first IAC layer 408 and the eidetic memory features 414. In additional or alternative examples, the second IAC layer 410 receives the output of the collation sublayer of the first IAC layer 408 via the skip connection. In the example of FIG. 4, the model executor 312 executes the first IAC layer 408. For example, the model executor 312 dynamically interleaves inception convolutions of varying sizes with atrous convolutions of varying sizes and collates (e.g., combines) the inception and atrous features with eidetic memory features 412. In some examples, the model executor 312 may determine that it is advantageous to skip the next IAC layer (e.g., second IAC layer 410). In such examples, the model executor 312 transmits the output of the first IAC layer 408 to the collation sublayer (not illustrated) of the second IAC layer 410 via a context-based skip connection.

In the illustrated example of FIG. 4, the second IAC layer 410 operates similarly to the first IAC layer 408. After the IAC layers of the pixel-level interactive segmentation NN 400 have processed the input matrix and/or matrices, the pixel-level interactive segmentation NN 400 generates one or more image segments 416 based on the selections (e.g., user input) identified in the input matrices to the pixel-level interactive segmentation NN 400. The interactive segmentation engine 302 displays the one or more image segments 416.

In the illustrated example of FIG. 4, the one or more image segments 416 correspond to a current video frame being analyzed by the pixel-level interactive segmentation NN 400. In some examples, the pixel-level interactive segmentation NN 400 orders the one or more image segments 416 based on likelihood of accuracy by pixel-level interactive segmentation NN 400. In other examples, the pixel-level interactive segmentation NN 400 provides a single image segment.

Figure 5:
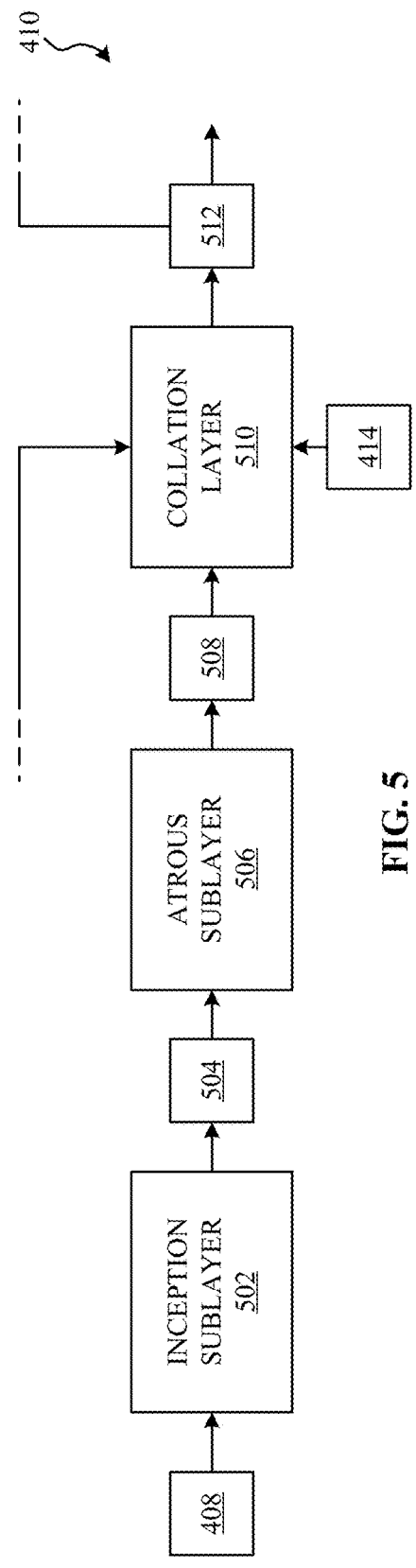
FIG. 5 is a block diagram showing additional detail of a second IAC layer of the pixel-level interactive segmentation NN of FIG. 3.

FIG. 5 is a block diagram showing additional detail of the second IAC layer 410 of the pixel-level interactive segmentation NN 400 of FIG. 4. The second IAC layer 410 includes an example inception sublayer 502, an example first embedding sublayer 504, an example atrous sublayer 506, an example second embedding sublayer 508, an example collation sublayer 510, and an example third embedding sublayer 512. The description of the second IAC layer 410 similarly applies to other IAC layers of the pixel-level interactive segmentation NN 400. For example, the described functionality of the second IAC layer 410 also applies to the first IAC layer 408.

In the illustrated example of FIG. 5, the second IAC layer 410 represents a sequential chain of the inception sublayer 502, the atrous sublayer 506, and the collation sublayer 510. In the example of FIG. 5, the inception sublayer 502 receives the output of the first IAC layer 408. In the example of FIG. 5, the inception controller 314 executes the inception sublayer 502. For example, the inception controller 314 executes inception convolutions with kernels of varying sizes. In some example, the inception controller 314 elects to skip the inception sublayer 502 as described above.

In the illustrated example of FIG. 5, the first embedding sublayer 504 receives the output of the inception sublayer 502. In the example of FIG. 5, the feature embedding controller 320 executes the first embedding sublayer 504. For example, the feature embedding controller 320 embeds features from one or more channels of the input matrix and/or matrices to the first embedding sublayer 504. The feature embedding controller 320 also generates per-channel modulation weights for the embedded features. The second embedding sublayer 508 and the third embedding sublayer 512 operate similarly to the first embedding sublayer 504. The output of each sublayer is processed by a feature embedding sublayer before passing to the next sublayer to further improve information flow through the IAC layer.

In the illustrated example of FIG. 5, the atrous sublayer 506 receives the output of the first embedding sublayer 504 (e.g., embedded inception features). In the example of FIG. 5, the atrous controller 316 executes the atrous sublayer 506. For example, the atrous controller 316 dynamically combines atrous convolution kernels of varying sizes. In some examples, the atrous controller 316 elects to skip the atrous sublayer 506 as described above.

In the illustrated example of FIG. 5, the collation sublayer 510 receives the output of the second embedding sublayer 508 (e.g., embedded atrous features, a tensor of activations which are representative of various features of the image from the previous sublayer) and the eidetic memory features 414. In the example of FIG. 5, the collation controller 318 executes the collation sublayer 510. For example, the collation controller 318 aggregates the multi-scale convolution activations generated by execution of the inception sublayer 502, multi-scale atrous activations generated by execution of the atrous sublayer 506, and context features (e.g., input features including, in the case of interactive segmentation, user feedback). The output of the collation sublayer 510 (e.g., collated features) are processed by the feature embedding controller 320 when executing the third embedding sublayer 512. In some examples the collation controller 318 elects to skip the next IAC layer as described above.

Figure 6:
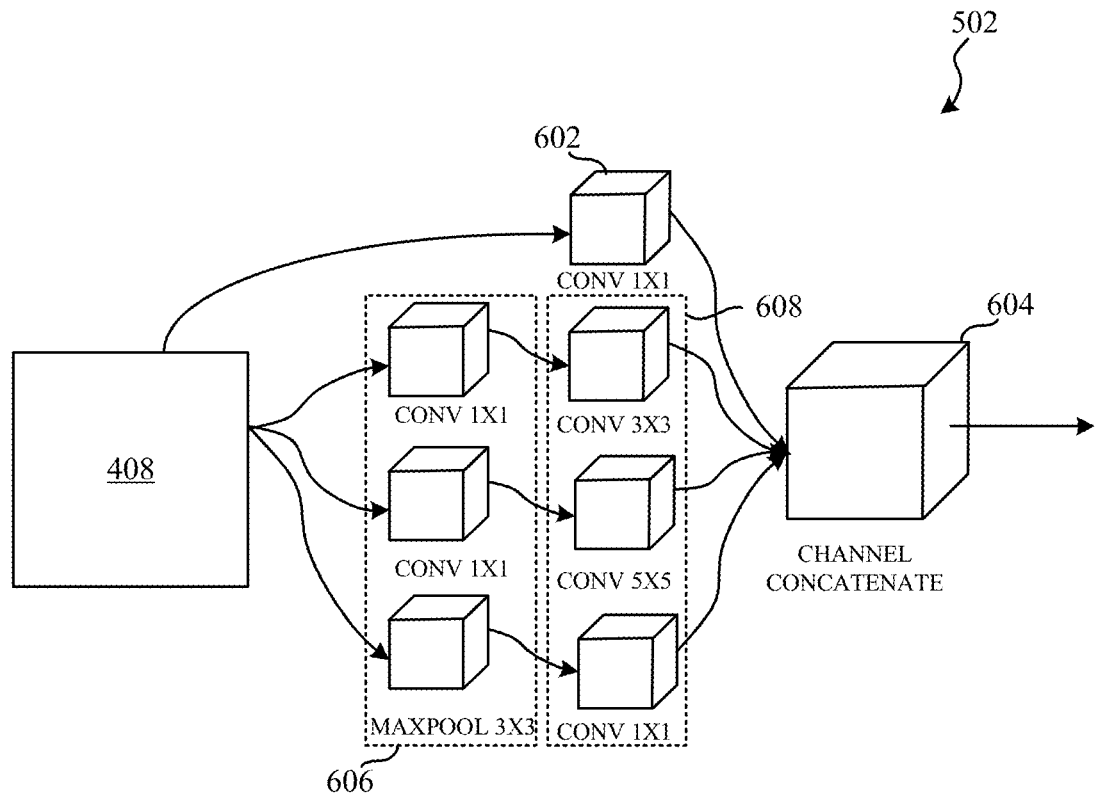
FIG. 6 is a block diagram showing additional detail of an inception sublayer of the second IAC layer of FIGS. 4 and/or 5.

FIG. 6 is a block diagram showing additional detail of the inception sublayer 502 of the second IAC layer 410 of FIGS. 4 and/or 5. For example, when executing the inception sublayer 502, the inception controller 314 determines whether to skip the inception sublayer 502. For example, the inception controller 314 determines to skip the inception sublayer 502 if performing inception convolutions would not be advantageous as described above. If the inception controller 314 determines to skip the inception sublayer 502, the inception controller 314 performs an example 1×1 convolution operation 602 on the input matrix and/or matrices from the first IAC layer 408. The inception controller 314 performs an example channel concatenate operation 604 on the result of the 1×1 convolution operation 602 and transmits the result to the first embedding sublayer 504. The path from operation 602 to operation 604 is referred to as a residual path that allows information to effectively bypass convolution operations altogether which preserves residual feature data.

Alternatively, if the inception controller 314 determines not to skip the inception sublayer 502, the inception controller 314 executes an example first set of operations 606 on the output of the first IAC layer 408. For example, the inception controller 314 executes two or more convolutions and a maxpooling operation. For example, to execute the first set of operations 606, the inception controller 314 performs two 1×1 convolutions and a 3×3 maxpooling operation. Additionally, the inception controller 314 processes the outputs of the first set of operations 606 via an example second set of operations 608. For example, to execute the second set of operations 608, the inception controller 314 performs a 3×3 convolution on the output of the first 1×1 convolution, a 5×5 convolution on the output of the second 1×1 convolution, and a 1×1 convolution on the output of the 3×3 maxpooling operation. The inception controller 314 concatenates the output of the second set of operations 608 via the channel concatenate operation 604. In this manner, the inception controller 314 generates one or more multi-scale inception features that form a dense representation of the input image.

Figure 7:
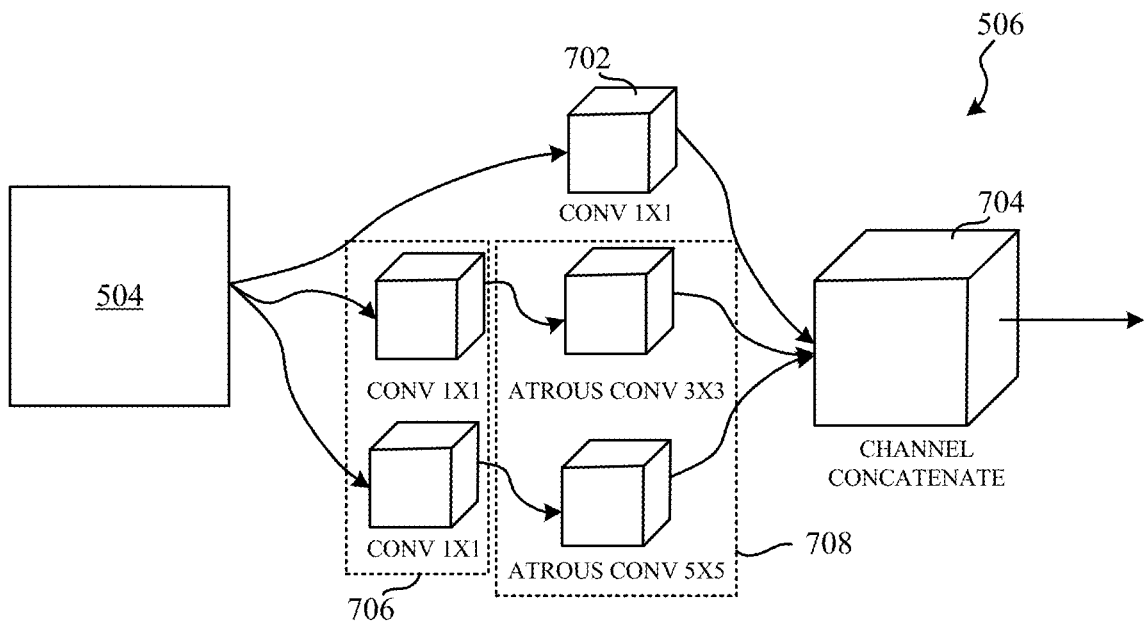
FIG. 7 is a block diagram showing additional detail of an atrous sublayer of the second IAC layer of FIGS. 4 and/or 5.

FIG. 7 is a block diagram showing additional detail of an atrous sublayer of the second IAC layer of FIGS. 4 and/or 5. For example, when executing the atrous sublayer 506, the atrous controller 316 determines whether to skip the atrous sublayer 506. For example, the atrous controller 316 determines to skip the atrous sublayer 506 if performing atrous convolutions would not be advantageous as described above. If the atrous controller 316 determines to skip the atrous sublayer 506, the atrous controller 316 performs an example 1×1 convolution operation 702 on the input matrix and/or matrices from the first embedding sublayer 504. The atrous controller 316 performs an example channel concatenate operation 704 on the result of the 1×1 convolution operation 702 and transmits the result to the second embedding sublayer 508. The path from operation 702 to operation 704 is referred to as a residual path that allows information to effectively bypass atrous convolution operations altogether which preserves residual feature data. The residual paths disclosed herein (e.g., in the inception sublayer 502 and in the atrous sublayer 506) preserves image quality and/or fidelity and does not down sample the features. As such, the residual paths disclosed herein allow for crisper object outlines.

Alternatively, if the atrous controller 316 determines not to skip the atrous sublayer 506, the atrous controller 316 executes an example first set of operations 706 on the output of the first embedding sublayer 504. For example, the atrous controller 316 executes two or more atrous convolutions. For example, to execute the first set of operations 706, the atrous controller 316 performs two 1×1 convolutions. Additionally, the atrous controller 316 processes the outputs of the first set of operations 706 via an example second set of operations 708. For example, to execute the second set of operations 708, the atrous controller 316 performs a 3×3 atrous convolution on the output of the first 1×1 convolution and a 5×5 atrous convolution on the output of the second 1×1 convolution. The atrous controller 316 concatenates the output of the second set of operations 708 via the channel concatenate operation 704. In this manner, the atrous controller 316 generates one or more multi-scale atrous features to expand the effective receptive field of view of the pixel-level interactive segmentation NN 400.

Figures 8, 9:
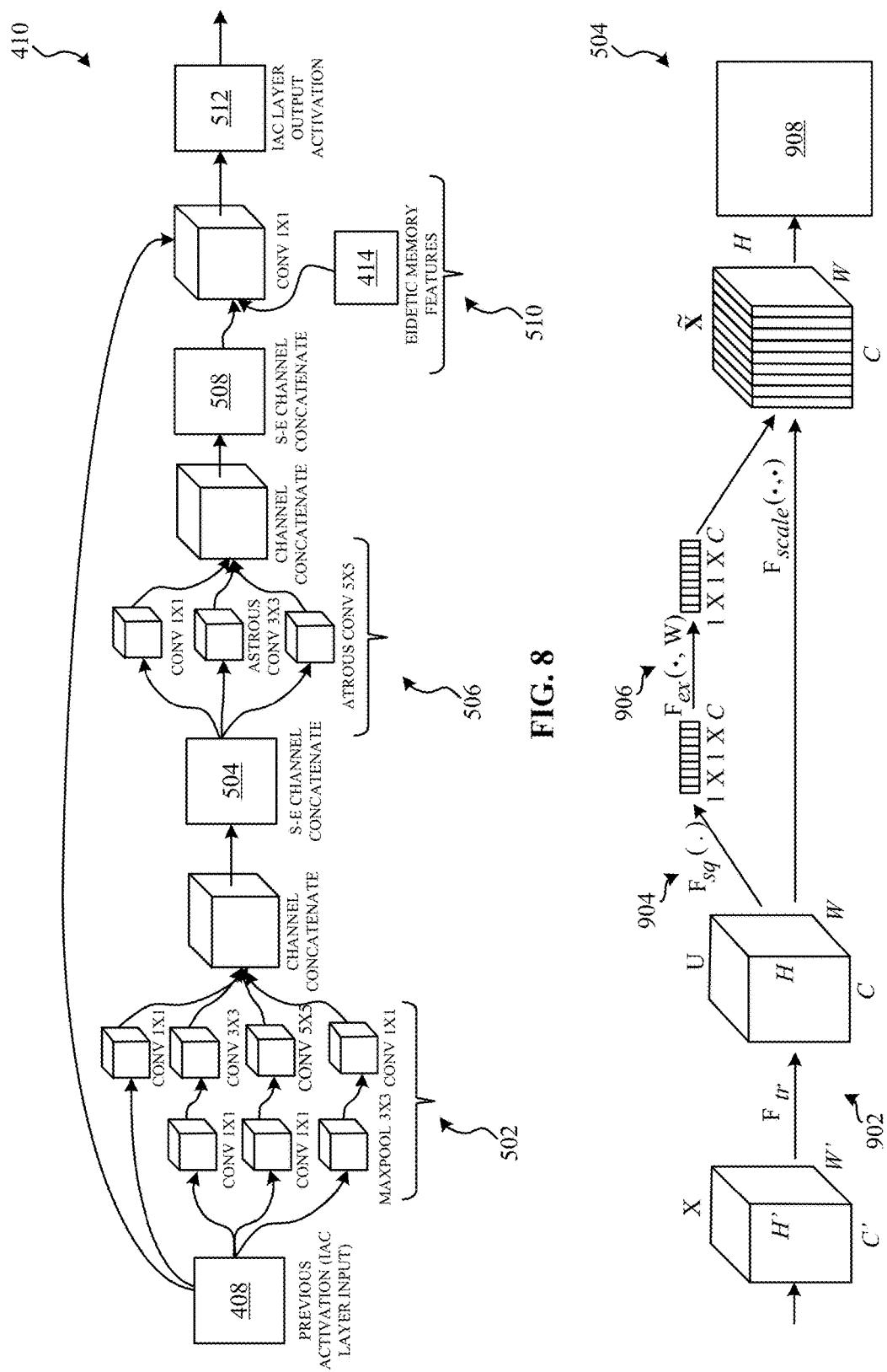
FIG. 8 is a block diagram showing additional detail of the second IAC layer of FIGS. 4 and/or 5.
FIG. 9 is a block diagram showing additional detail of a feature embedding sublayer of the second IAC layer of FIGS. 5, 7, and/or 8.

FIG. 8 is a block diagram showing additional detail of the second IAC layer 410 of FIGS. 4 and/or 5. The second IAC layer 410 of FIG. 8 illustrates a comprehensive block diagram of the operation executed by the model executor 312. For example, when the model executor 312 executes the second IAC layer 410, the inception controller 314 executes the inception sublayer 502 as described above in connection with FIGS. 3, 4, 5, and/or 6. Additionally, when the model executor 312 executes the second IAC layer 410, the atrous controller 316 executes the atrous sublayer 506 as described above in connection with FIGS. 3, 4, 5, and/or 7. As illustrated in FIG. 8, the atrous sublayer 506 omits the example operations 706 for brevity. However, in operation, the interactive segmentation engine 302 executes the example operations 706.

In the illustrated example of FIG. 8, when the model executor 312 execute the collation sublayer 510, the collation controller 318 executes an example 1×1 convolution operation 802. For example, by executing the 1×1 convolution operation 802, the collation controller 318 assimilates (e.g., combines, joins together) the multi-scale information provided by the inception controller 314 (e.g., when executing the inception sublayer 502), the atrous controller 316 (e.g., when executing the atrous sublayer 506), and the eidetic memory features 414. As such, by executing the collation sublayer 510, the collation controller 318 calibrates the persistent features (e.g., input image, user-provided labels) of the pixel-level interactive segmentation NN 400 with densely rendered, multi-scale features. In this manner, the model executor 312, when executing the pixel-level interactive segmentation NN 400, determines the importance of different multi-scale features by using these persistent features as a template. Because the model executor 312, when executing the pixel-level interactive segmentation NN 400, does not need to allocate extra overhead to encode these persistent features, the model executor 312, when executing the pixel-level interactive segmentation NN 400, gains additional efficiency.

FIG. 9 is a block diagram showing additional detail of the first embedding sublayer 504 of the second IAC layer 410 of FIGS. 5, 7, and/or 8. While described in connection with the first embedding sublayer 504, the description of FIG. 8 similarly applies to the second embedding sublayer 508 and/or the third embedding sublayer 512. Additionally, as described above, each of the inception sublayer 502, the atrous sublayer 506, and the collation sublayer 510 is followed by an embedding sublayer. For example, the inception sublayer is followed by the first embedding sublayer 504, the atrous sublayer 506 is following by the second embedding sublayer 508, and the collation sublayer 510 is followed by the third embedding sublayer 512.

In the illustrated example of FIG. 9, the feature embedding controller 320, when executing the first embedding sublayer 504, adaptively recalibrates channel-wise feature responses by explicitly modeling interdependencies between channels. For example, the feature embedding controller 320 executes an example transform operation 902 to map an input matrix X to a feature map U. For example, the transform operation 902 may be a convolution. Additionally, the feature embedding controller 320 executes an example squeeze operation 904 that generates descriptors for the channel(s) of the input features (e.g., the output of operation 902) by aggregating feature maps across the corresponding spatial dimensions.

In the illustrated example of FIG. 9, by executing operation 904, the feature embedding controller 320 embeds the global distribution of channel-wise features which allows for allows for information from the ERF of the pixel-level interactive segmentation NN 400 to be used by all the layers of the pixel-level interactive segmentation NN 400. In the example of FIG. 9, the feature embedding controller 320 additionally executes an example excitation operation 906 to generate per-channel modulation weights for the embedded features. Subsequently, the feature embedding controller 320 executes an example channel concatenate operation 908 on the result of the operation 906.

Figure 10:
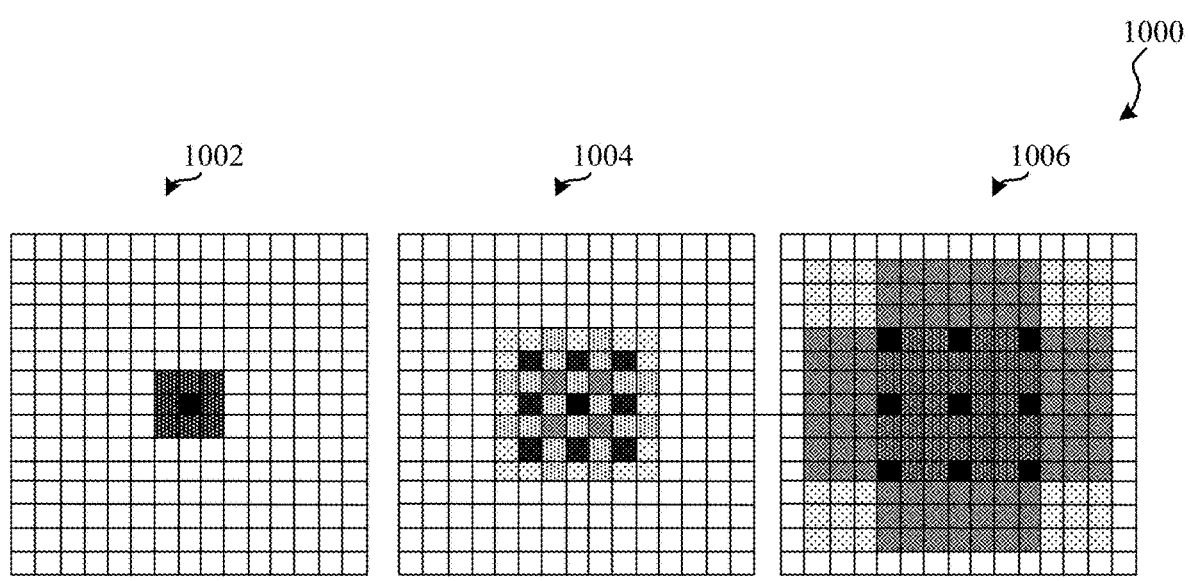
FIG. 10 is a graphical illustration showing improvements to the problem associated with sequential atrous convolutions illustrated in FIG. 2.

FIG. 10 is a graphical illustration 1000 showing improvements to the problem associated with sequential atrous convolutions illustrated in FIG. 2. The graphical illustration 1000 illustrates example results of interleaving inception convolution operations with atrous convolutions in example IAC layers disclosed herein. For example, by executing the IAC layers disclosed herein, the interactive segmentation engine 302 provides a solution to gridding by allowing for network paths of a deep CNN (e.g., the pixel-level interactive segmentation NN 400) that contribute simultaneously to increasing the receptive field of view of the deep CNN while densely populating the sparse signal generated by the atrous convolutions.

In the illustrated example of FIG. 10, as the interactive segmentation engine 302 executes example IAC layers 1002, 1004, and 1006, the interactive segmentation engine 302 densely populates the sparse signal generated by the atrous convolutions with inception features generated by the inception convolutions. The example IAC layers disclosed herein apply the utility of atrous convolutions, increase the combinatorial number of viable network paths from input to output, and reduce gridding to increase the ERF of CNNs. Thus, the net effect of this architectural improvements disclosed herein provides a successful trade-off between model sensitivity for nuanced local features (e.g., small receptive field) and global feature assimilation (e.g., large receptive field). As the pixel-level interactive segmentation NN 400 gets deeper, the atrous controller 316 increases the dilation rate by a factor of two from one layer to the next (e.g., D=1 for layer 1, D=2 for layer 2, D=4 for layer 3, etc.).

Figure 11:
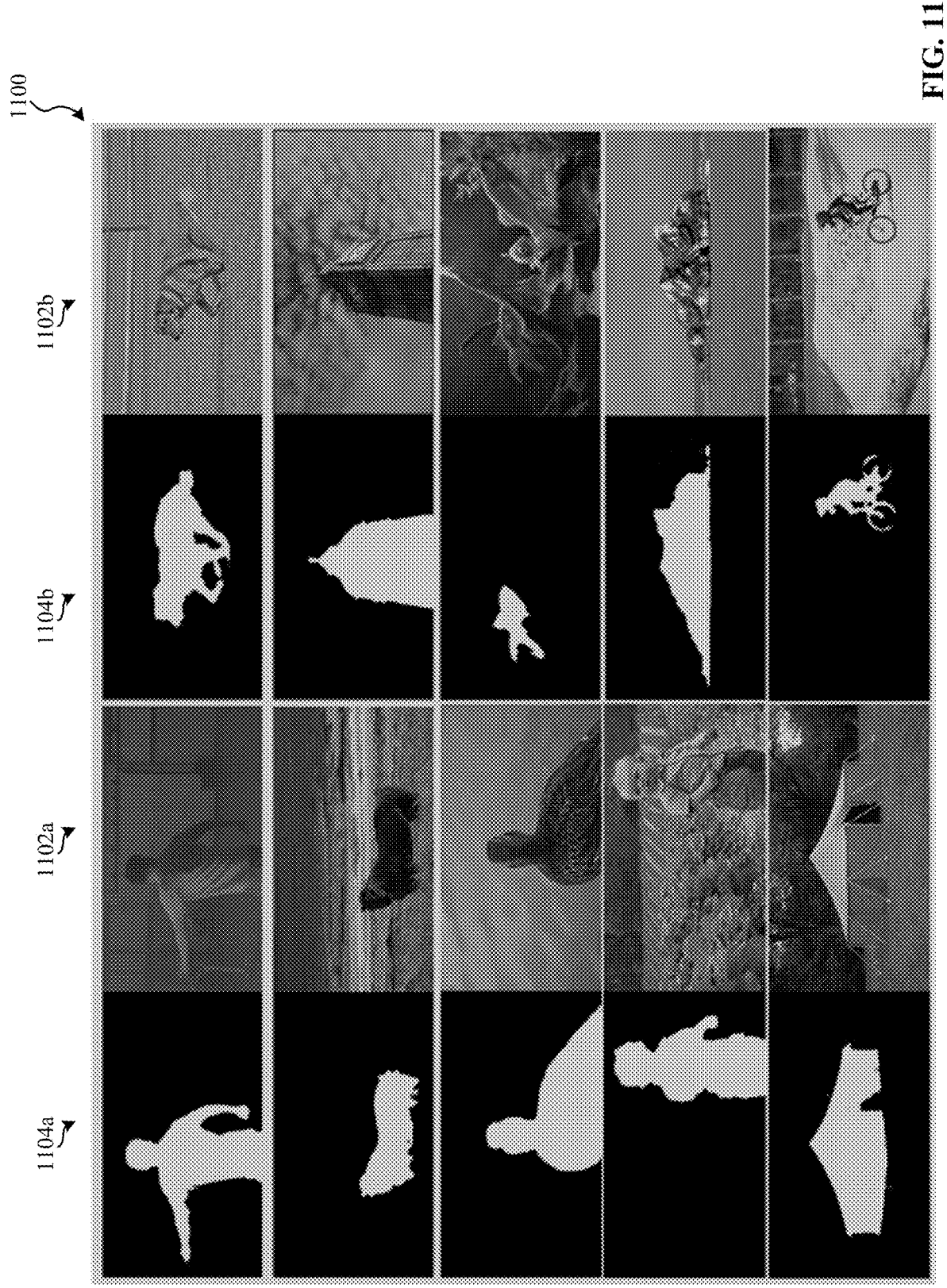
FIG. 11 is a graphical illustration showing segmentations produced by the interactive segmentation engine of FIG. 3.

FIG. 11 is a graphical illustration 1100 showing segmentations produced by the interactive segmentation engine 302 of FIG. 3. The graphical illustration 1100 includes example input images 1102a, b and corresponding example high-fidelity segmentations 1104a, b generated by the interactive segmentation engine 302 when executing the pixel-level interactive segmentation NN 400

When compared to baseline SOA fully convolutional networks (FCNs) consisting of only standard convolutional layers, examples disclosed herein outperform the baseline FCNs. The models were tested on the high-fidelity task of interactive image segmentation. Both models were trained on the same dataset consisting of 23,924 images (480×270 resolution). Additionally, the models were validated using 1,468 validation images. The input features to both models were identical. The baseline model included 10 general convolution layers and the example pixel-level interactive segmentation NN disclosed herein included 10 IAC layers.

The results of the comparison are illustrated in Table 1 below. Table 1 shows the mean train loss after 10 epochs for each model; the mean validation intersection-over-union (IOU), denoted mIOU; and the median validation IOU, denoted medIOU. IOU is a standard metric ([0,1]) used to assess segmentation quality where 1 denotes a perfect segmentation.

TABLE 1

| Model | Mean Train Loss | Val mIOU | Val medIOU |
| --- | --- | --- | --- |
| Baseline | 0.1769 | 0.7083 | 0.7873 |
| Examples Disclosed Herein | 0.1460 | 0.7300 | 0.8180 |

While an example manner of implementing the interactive segmentation engine 302 of FIG. 3 is illustrated in FIG. 3, one or more of the elements, processes and/or devices illustrated in FIG. 3 may be combined, divided, re-arranged, omitted, eliminated and/or implemented in any other way. Further, the example communication processor 308, the example feature extraction controller 310, the example model executor 312, the example inception controller 314, the example atrous controller 316, the example collation controller 318, the example feature embedding controller 320, the example datastore 322, and/or, more generally, the example interactive segmentation engine 302 of FIG. 3 may be implemented by hardware, software, firmware and/or any combination of hardware, software and/or firmware. Thus, for example, any of the example communication processor 308, the example feature extraction controller 310, the example model executor 312, the example inception controller 314, the example atrous controller 316, the example collation controller 318, the example feature embedding controller 320, the example datastore 322, and/or, more generally, the example interactive segmentation engine 302 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 308, the example feature extraction controller 310, the example model executor 312, the example inception controller 314, the example atrous controller 316, the example collation controller 318, the example feature embedding controller 320, the example datastore 322, and/or, more generally, the example interactive segmentation engine 302 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example interactive segmentation engine 302 of FIG. 3 may include one or more elements, processes and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
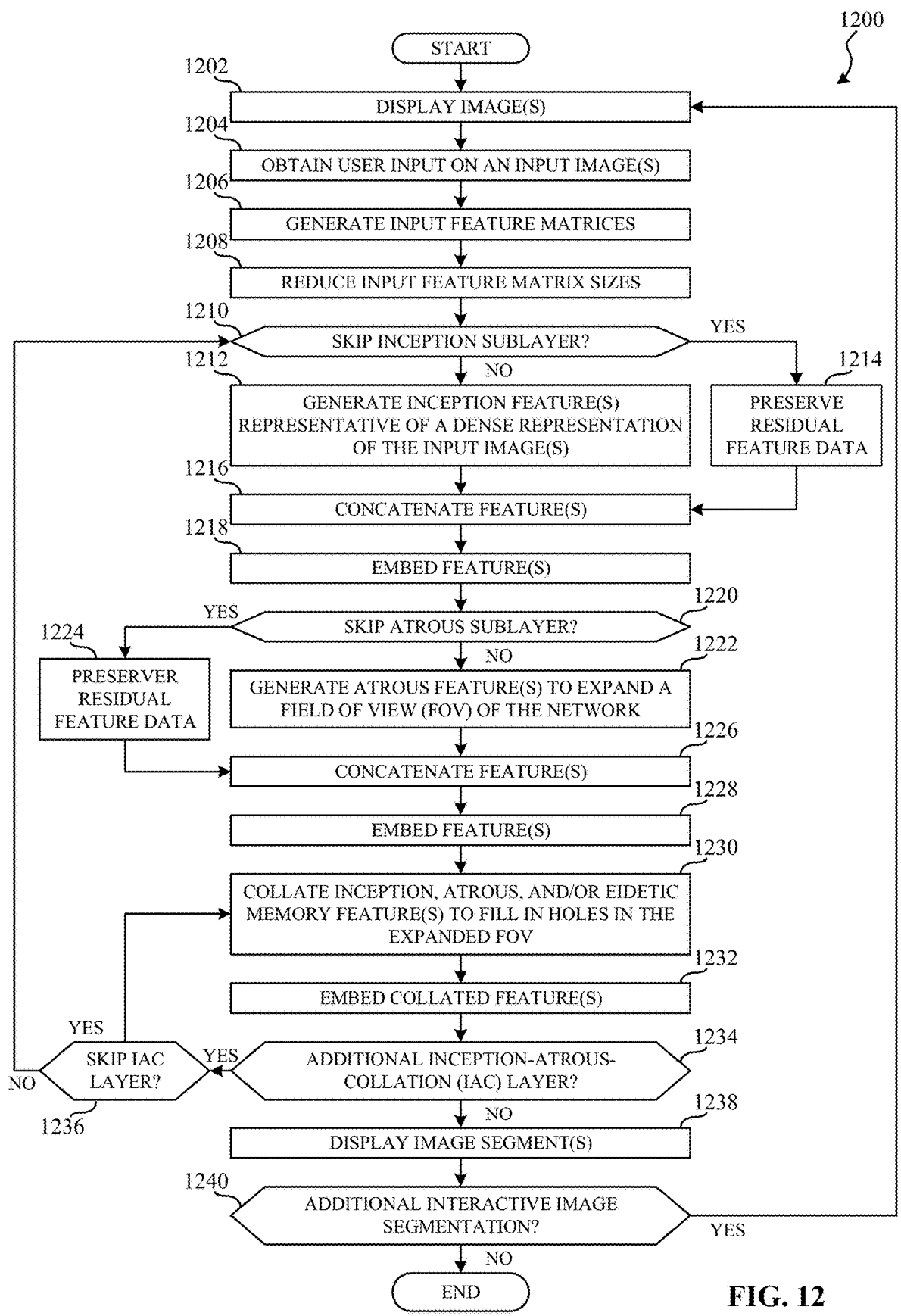
FIG. 12 is a flowchart representative of machine-readable instructions which may be executed to implement the interactive segmentation engine of FIG. 3.

A flowchart representative of example hardware logic, machine readable instructions, hardware implemented state machines, and/or any combination thereof for implementing the interactive segmentation engine 302 of FIG. 3 is shown in FIG. 12. The machine-readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 13, many other methods of implementing the example interactive segmentation engine 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 12 is a flowchart representative of machine-readable instructions 1200 which may be executed to implement the interactive segmentation engine 302 of FIG. 3. For example, in response to a request to perform interactive segmentation, the interactive segmentation engine 302 may execute a pixel-level interactive segmentation NN including one or more IAC layers represented by the machine-readable instructions 1200. The machine-readable instructions 1200 begin at block 1202 where the communication processor 308 displays one or more images (e.g., one or more still images and/or one or more video clips). At block 1204, the communication processor 308 obtains user input on the input image(s) from the end-user device 306. For example, at block 1204, the communication processor 308 obtains positive and/or negative clicks.

In the illustrated example of FIG. 12, at block 1206, the feature extraction controller 310 generates one or more input feature matrices. For example, at block 1206, the feature extraction controller 310 generates context features and/or eidetic memory features. At block 1208, the model executor 312 reduces the size(s) of the one or more input feature matrices. For example, at block 1208, the inception controller 314 reduces the size(s) of the one or more input feature matrices by executing a 1×1 convolution with the one or more input feature matrices as the input.

In the illustrated example of FIG. 12, at block 1210, the model executor 312 determines whether to skip an inception sublayer of the pixel-level interactive segmentation NN. For example, at block 1210, the inception controller 314 determines whether to skip an inception sublayer of the pixel-level interactive segmentation NN. In response to the model executor 312 determining not to skip the inception sublayer (block 1210: NO), the machine-readable instructions 1200 proceed to block 1212. At block 1212, the model executor 312 generates one or more inception features representative of a dense representation of the one or more input images. For example, at block 1212, the inception controller 314 generates one or more inception features representative of a dense representation of the one or more input images.

In the illustrated example of FIG. 12, in response to the model executor 312 determining to skip the inception sublayer (block 1210: YES), the machine-readable instructions 1200 proceed to block 1214. At block 1214, the model executor 312 preserve residual feature data in the input feature matrices to the inception sublayer. For example, at block 1214, the inception controller 314 executes a 1×1 convolution on the input feature matrices to the inception sublayer to preserve residual feature data. At block 1216, the model executor 312 concatenates the features output by the inception layer (e.g., inception features or preserved feature data). For example, at block 1216, the inception controller 314 concatenates the features output by the inception layer (e.g., inception features or preserved feature data).

In the illustrated example of FIG. 12, at block 1218, the model executor 312 embeds the features output from the inception sublayer. For example, at block 1218, the feature embedding controller 320 embeds the features output from the inception sublayer. At block 1220, the model executor 312 determines whether to skip an atrous sublayer of the pixel-level interactive segmentation NN. For example, at block 1220, the atrous controller 316 determines whether to skip an atrous sublayer of the pixel-level interactive segmentation NN. In response to the model executor 312 determining not to skip the atrous sublayer (block 1220: NO), the machine-readable instructions 1200 proceed to block 1222. At block 1222, the model executor 312 generates one or more atrous features to expand a field of view of the pixel-level interactive segmentation NN. For example, at block 1222, the atrous controller 316 generates one or more atrous features to expand a field of view of the pixel-level interactive segmentation NN.

In the illustrated example of FIG. 12, in response to the model executor 312 determining to skip the atrous sublayer (block 1220: YES), the machine-readable instructions 1200 proceed to block 1224. At block 1224, the model executor 312 preserve residual feature data in the features output by the inception layer (e.g., inception features or preserved feature data). For example, at block 1224, the atrous controller 316 executes a 1×1 convolution on the features output by the inception layer. At block 1226, the model executor 312 concatenates the features output by the atrous layer (e.g., atrous features or preserved feature data). For example, at block 1226, the atrous controller 316 concatenates the features output by the atrous layer (e.g., atrous features or preserved feature data).

In the illustrated example of FIG. 12, at block 1228, the model executor 312 embeds the features output from the atrous sublayer. For example, at block 1228, the feature embedding controller 320 embeds the features output from the atrous sublayer. At block 1230, the model executor 312 collates the inception features, the atrous features, and/or the eidetic memory features to fill in holes in the expanded field of view of the pixel-level interactive segmentation NN. For example, at block 1230, the collation controller 318 collates the inception features, the atrous features, and/or the eidetic memory features to fill in holes in the expanded field of view of the pixel-level interactive segmentation NN. For example, at block 1230, the collation controller 318 performs a 1×1 compression convolution.

Figure 13:
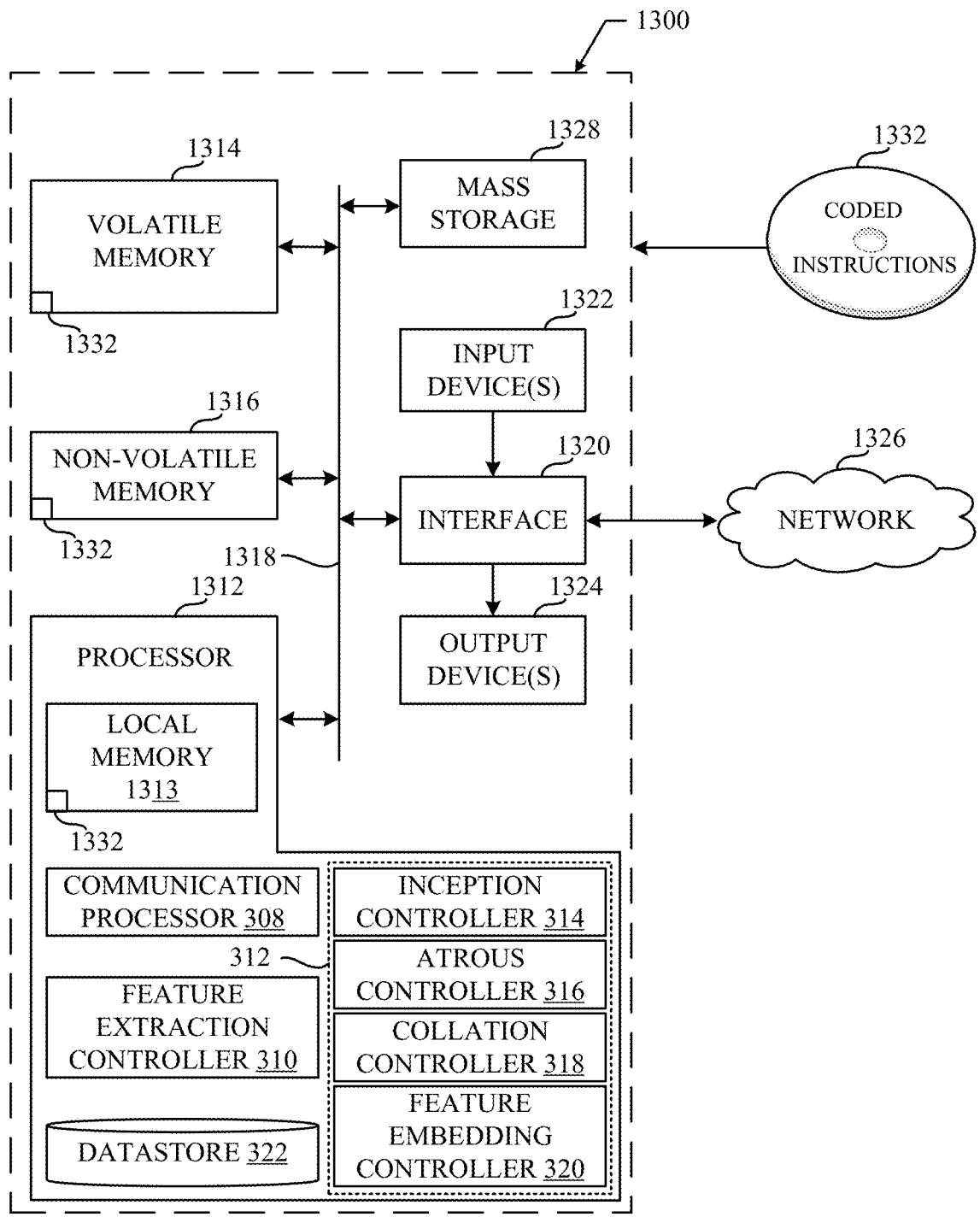
FIG. 13 is a block diagram of an example processing platform structured to execute the instructions of FIG. 12 to implement the pixel-level interactive segmentation engine of FIG. 3.

In the illustrated example of FIG. 13, at block 1232, the model executor 312 embeds the collated features. For example, at block 1232, the feature embedding controller 320 embeds the collated features. At block 1234, the model executor 312 determines whether an additional IAC layer is present in the pixel-level interactive segmentation NN. For example, at block 1234, the collation controller 318 determines whether an additional IAC layer is present in the pixel-level interactive segmentation NN. In response to the model executor 312 determining that there are additional IAC layers (block 1234: YES), the machine-readable instructions 1200 proceed to block 1236.

In the illustrated example of FIG. 13, at block 1236, the model executor 312 determines whether to skip the IAC layer. For example, at block 1236, the collation controller 318 determines whether to skip the IAC layer. In response to the model executor 312 determining to skip the IAC layer (block 1236: YES), the machine-readable instructions 1200 return to block 1230. In response to the model executor 312 determining not to skip the IAC layer (block 1236: NO), the machine-readable instructions 1200 return to block 1210.

Returning to block 1234, in response to the model executor 312 determining that there are not additional IAC layers (block 1234: NO), the machine-readable instructions 1200 proceed to block 1238. At block 1238, the communication processor 308 displays one or more image segmentations to the entity (e.g., a user) that requested performance of interactive segmentation. At block 1240, the communication processor 308 determines whether there are additional interactive image segmentations to perform. In response to the communication processor 308 determining that there are additional interactive image segmentations to perform (block 1240: YES), the machine-readable instructions 1200 return to 1202. In response to the communication processor 308 determining that there are not additional interactive image segmentations to perform (block 1240: NO), the machine-readable instructions 1200 terminate.

FIG. 13 is a block diagram of an example processor platform 1300 structured to execute the instructions of FIG. 13 to implement the interactive segmentation engine 302 of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor 1312 may be a semiconductor based (e.g., silicon based) device. In this example, the processor 1312 implements the example communication processor 308, the example feature extraction controller 310, the example model executor 312, the example inception controller 314, the example atrous controller 316, the example collation controller 318, the example feature embedding controller 320, and/or the example datastore 322.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 13 may implement the machine-readable instructions 1200 of FIG. 12. Additionally, the machine executable instructions 1332 of FIG. 13 may be stored in the mass storage device 1328, in the volatile memory 1314, in the non-volatile memory 1316, and/or on a removable non-transitory computer readable storage medium such as a CD or DVD.

Figure 14:
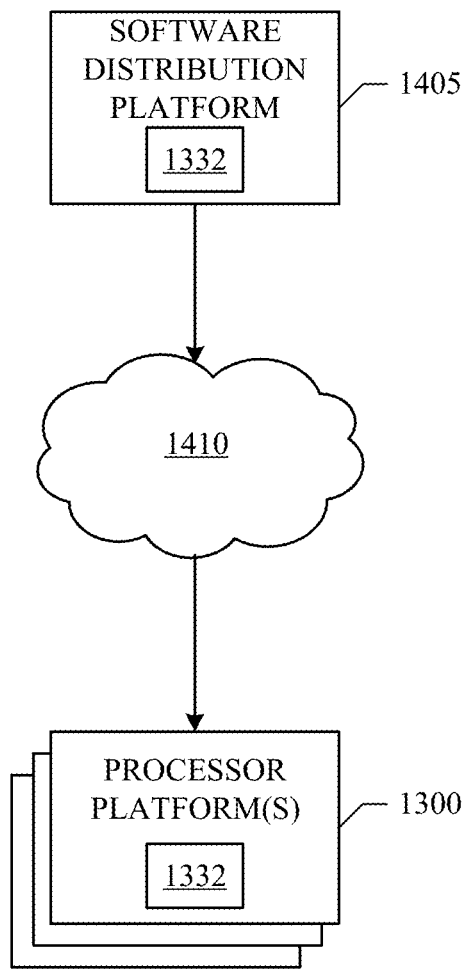
FIG. 14 is a block diagram of an example software distribution platform to distribute software (e.g., software corresponding to the example computer readable instructions of FIG. 13) to client devices such as those owned and/or operated by consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1405 to distribute software such as the example computer readable instructions 1332 of FIG. 13 to devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1332 of FIG. 13. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the computer readable instructions 1332, which may correspond to the example computer readable instructions 1200 of FIG. 12, as described above. The one or more servers of the example software distribution platform 1405 are in communication with a network 1410, which may correspond to any one or more of the Internet and/or any of the example network 304 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1332 from the software distribution platform 1405. For example, the software, which may correspond to the example computer readable instructions 1332 of FIG. 13, may be downloaded to the example processor platform 1300, which is to execute the computer readable instructions 1332 to implement the interactive segmentation engine 302. In some example, one or more servers of the software distribution platform 1405 periodically offer, transmit, and/or force updates to the software (e.g., the example computer readable instructions 1332 of FIG. 13) to ensure improvements, patches, updates, etc. are distributed and applied to the software at the end user devices.

From the foregoing, it will be appreciated that example methods, apparatus, and articles of manufacture have been disclosed for interactive image segmentation. Examples methods, apparatus, and articles of manufacture include architectural improvements for deep CNNs to enhance model performance across a variety of computer vision applications. Examples disclosed herein address the gridding problem and improve the calibration of the ERF for deep CNNs. Accordingly, examples disclosed herein advance the fidelity of model inference for high quality, pixel-level segmentation tasks.

The example IAC layers disclosed herein include an example inception layer that, when executed, efficiently and dynamically combines inception convolutional filters of varying sizes. The example IAC layers disclosed herein additionally include an example atrous layer that, when executed, dynamically combines atrous convolutional filters of varying sizes. The example IAC layers disclosed herein additionally include an example collation layer that, when executed, allows for the collation and data-driven compression of standard multi-scale convolution activations, multi-scale atrous activations, and context features.

Example methods, apparatus, and articles of manufacture have been disclosed that increase the efficiency of executing neural networks. For example, the disclosed methods, apparatus, and articles of manufacture improve the efficiency of using a computing device by reduce the overhead to encode persistent features in a deep CNN. The disclosed methods, apparatus, and articles of manufacture are accordingly directed to one or more improvement(s) in the functioning of a computer.

Example methods, apparatus, systems, and articles of manufacture for interactive image segmentation are disclosed herein. Further examples and combinations thereof include the following:

Example 1 includes an apparatus for interactive image segmentation, the apparatus comprising an inception controller to execute an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input, an atrous controller to execute an atrous sublayer of the CNN, the atrous sublayer including two or more atrous convolutions including respective kernels of varying sizes to generate multi-scale atrous features, and a collation controller to execute a collation sublayer of the CNN to collate the multi-scale inception features, the multi-scale atrous features, and eidetic memory features.

Example 2 includes the apparatus of example 1, wherein the inception controller is to bypass the inception sublayer in response to determining that bypassing the inception sublayer would be advantageous to the CNN.

Example 3 includes the apparatus of example 2, wherein the inception controller is to bypass the inception sublayer to preserve data in one or more input feature matrices to the inception sublayer.

Example 4 includes the apparatus of example 1, wherein the atrous controller is to bypass the atrous sublayer in response to determining that bypassing the atrous sublayer would be advantageous to the CNN.

Example 5 includes the apparatus of example 4, wherein the atrous controller is to bypass the atrous sublayer to preserve data in the inception features.

Example 6 includes the apparatus of example 1, wherein the collation controller is to bypass a subsequent IAC layer in response to determining that bypassing the subsequent IAC layer would be advantageous to the CNN.

Example 7 includes the apparatus of example 1, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

Example 8 includes a non-transitory computer-readable medium comprising instructions which, when executed, cause at least one processor to at least implement an inception sublayer of a convolutional neural network (CNN)

including two or more inception-atrous-collation (IAC) layers, the inception sublayer including two or more convolutions including respective kernels of varying sizes to generate multi-scale inception features, the inception sublayer to receive one or more context features indicative of user input, implement an atrous sublayer of the CNN, the atrous sublayer including two or more atrous convolutions including respective kernels of varying sizes to generate multi-scale atrous features, and implement a collation sublayer of the CNN to collate the multi-scale inception features, the multi-scale atrous features, and eidetic memory features.

Example 9 includes the non-transitory computer-readable medium of example 8, wherein the instructions, when executed, cause the at least one processor to bypass the inception sublayer in response to determining that bypassing the inception sublayer would be advantageous to the CNN.

Example 10 includes the non-transitory computer-readable medium of example 9, wherein the instructions, when executed, cause the at least one processor to bypass the inception sublayer to preserve data in one or more input feature matrices to the inception sublayer.

Example 11 includes the non-transitory computer-readable medium of example 8, wherein the instructions, when executed, cause the at least one processor to bypass the atrous sublayer in response to determining that bypassing the atrous sublayer would be advantageous to the CNN.

Example 12 includes the non-transitory computer-readable medium of example 11, wherein the instructions, when executed, cause the at least one processor to bypass the atrous sublayer to preserve data in the inception features.

Example 13 includes the non-transitory computer-readable medium of example 8, wherein the instructions, when executed, cause the at least one processor to bypass a subsequent IAC layer in response to determining that bypassing the subsequent IAC layer would be advantageous to the CNN.

Example 14 includes the non-transitory computer-readable medium of example 8, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

Example 15 includes an apparatus for interactive image segmentation, the apparatus comprising memory, and at least one processor to execute machine readable instructions to cause the at least one processor to implement an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input, implement an atrous sublayer of the CNN, the atrous sublayer including two or more atrous convolutions including respective kernels of varying sizes to generate multi-scale atrous features, and implement a collation sublayer of the CNN to collate the multi-scale inception features, the multi-scale atrous features, and eidetic memory features.

Example 16 includes the apparatus of example 15, wherein the at least one processor is to bypass the inception sublayer in response to determining that bypassing the inception sublayer would be advantageous to the CNN.

Example 17 includes the apparatus of example 16, wherein the at least one processor is to bypass the inception sublayer to preserve data in one or more input feature matrices to the inception sublayer.

Example 18 includes the apparatus of example 15, wherein the at least one processor is to bypass the atrous sublayer in response to determining that bypassing the atrous sublayer would be advantageous to the CNN.

Example 19 includes the apparatus of example 18, wherein the at least one processor is to bypass the atrous sublayer to preserve data in the inception features.

Example 20 includes the apparatus of example 15, wherein the at least one processor is to bypass a subsequent IAC layer in response to determining that bypassing the subsequent IAC layer would be advantageous to the CNN.

Example 21 includes the apparatus of example 15, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

Example 22 includes a method for interactive image segmentation, the method comprising executing an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input, executing an atrous sublayer of the CNN, the atrous sublayer including two or more atrous convolutions including respective kernels of varying sizes to generate multi-scale atrous features, and executing a collation sublayer of the CNN to collate the multi-scale inception features, the multi-scale atrous features, and eidetic memory features.

Example 23 includes the method of example 22, further including bypassing the inception sublayer in response to determining that bypassing the inception sublayer would be advantageous to the CNN.

Example 24 includes the method of example 23, further including bypassing the inception sublayer to preserve data in one or more input feature matrices to the inception sublayer.

Example 25 includes the method of example 22, further including bypassing the atrous sublayer in response to determining that bypassing the atrous sublayer would be advantageous to the CNN.

Example 26 includes the method of example 25, further including bypassing the atrous sublayer to preserve data in the inception features.

Example 27 includes the method of example 22, further including bypassing a subsequent IAC layer in response to determining that bypassing the subsequent IAC layer would be advantageous to the CNN.

Example 28 includes the method of example 22, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

Example 29 includes an apparatus for interactive image segmentation, the apparatus comprising means for performing inception convolutions to execute an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input, means for performing atrous convolutions to execute an atrous sublayer of the CNN, the atrous sublayer including two or more atrous convolutions including respective kernels of varying sizes to generate multi-scale atrous features, and means for collating to execute a collation sublayer of the CNN to collate the multi-scale inception features, the multi-scale atrous features, and eidetic memory features.

Example 30 includes the apparatus of example 29, wherein the means for performing inception convolutions is to bypass the inception sublayer in response to determining that bypassing the inception sublayer would be advantageous to the CNN.

Example 31 includes the apparatus of example 30, wherein the means for performing inception convolutions is to bypass the inception sublayer to preserve data in one or more input feature matrices to the inception sublayer.

Example 32 includes the apparatus of example 29, wherein the means for performing atrous convolutions is to bypass the atrous sublayer in response to determining that bypassing the atrous sublayer would be advantageous to the CNN.

Example 33 includes the apparatus of example 32, wherein the means for performing atrous convolutions is to bypass the atrous sublayer to preserve data in the inception features.

Example 34 includes the apparatus of example 29, wherein the means for collating is to bypass a subsequent IAC layer in response to determining that bypassing the subsequent IAC layer would be advantageous to the CNN.

Example 35 includes the apparatus of example 29, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for interactive image segmentation, the apparatus comprising:
   an inception controller to execute an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input;
   an atrous controller to execute an atrous sublayer of the CNN, the atrous sublayer including two or more atrous convolutions including respective kernels of varying sizes to generate multi-scale atrous features; and
   a collation controller to execute a collation sublayer of the CNN to collate the multi-scale inception features, the multi-scale atrous features, and eidetic memory features.

2. The apparatus of claim 1, wherein the inception controller is to bypass the inception sublayer in response to determining that bypassing the inception sublayer would be advantageous to the CNN.

3. The apparatus of claim 2, wherein the inception controller is to bypass the inception sublayer to preserve data in one or more input feature matrices to the inception sublayer.

4. The apparatus of claim 1, wherein the atrous controller is to bypass the atrous sublayer in response to determining that bypassing the atrous sublayer would be advantageous to the CNN.

5. The apparatus of claim 4, wherein the atrous controller is to bypass the atrous sublayer to preserve data in the inception features.

6. The apparatus of claim 1, wherein the collation controller is to bypass a subsequent IAC layer in response to determining that bypassing the subsequent IAC layer would be advantageous to the CNN.

7. The apparatus of claim 1, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

8. A non-transitory computer-readable medium comprising instructions which, when executed, cause at least one processor to at least:
   implement an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input;
   implement an atrous sublayer of the CNN, the atrous sublayer including two or more atrous convolutions including respective kernels of varying sizes to generate multi-scale atrous features; and
   implement a collation sublayer of the CNN to collate the multi-scale inception features, the multi-scale atrous features, and eidetic memory features.

9. The non-transitory computer-readable medium of claim 8, wherein the instructions, when executed, cause the at least one processor to bypass the inception sublayer in response to determining that bypassing the inception sublayer would be advantageous to the CNN.

10. The non-transitory computer-readable medium of claim 9, wherein the instructions, when executed, cause the at least one processor to bypass the inception sublayer to preserve data in one or more input feature matrices to the inception sublayer.

11. The non-transitory computer-readable medium of claim 8, wherein the instructions, when executed, cause the at least one processor to bypass the atrous sublayer in response to determining that bypassing the atrous sublayer would be advantageous to the CNN.

12. The non-transitory computer-readable medium of claim 11, wherein the instructions, when executed, cause the at least one processor to bypass the atrous sublayer to preserve data in the inception features.

13. The non-transitory computer-readable medium of claim 8, wherein the instructions, when executed, cause the at least one processor to bypass a subsequent IAC layer in response to determining that bypassing the subsequent IAC layer would be advantageous to the CNN.

14. The non-transitory computer-readable medium of claim 8, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

15. An apparatus for interactive image segmentation, the apparatus comprising:
 memory; and
 at least one processor to execute machine readable instructions to cause the at least one processor to:
  implement an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input;
  implement an atrous sublayer of the CNN, the atrous sublayer including two or more atrous convolutions including respective kernels of varying sizes to generate multi-scale atrous features; and
  implement a collation sublayer of the CNN to collate the multi-scale inception features, the multi-scale atrous features, and eidetic memory features.

16. The apparatus of claim 15, wherein the at least one processor is to bypass the inception sublayer in response to determining that bypassing the inception sublayer would be advantageous to the CNN.

17. The apparatus of claim 16, wherein the at least one processor is to bypass the inception sublayer to preserve data in one or more input feature matrices to the inception sublayer.

18. The apparatus of claim 15, wherein the at least one processor is to bypass the atrous sublayer in response to determining that bypassing the atrous sublayer would be advantageous to the CNN.

19. The apparatus of claim 18, wherein the at least one processor is to bypass the atrous sublayer to preserve data in the inception features.

20. The apparatus of claim 15, wherein the at least one processor is to bypass a subsequent IAC layer in response to determining that bypassing the subsequent IAC layer would be advantageous to the CNN.

21. The apparatus of claim 15, wherein the user input corresponds to one or more selections in an image to be processed, the one or more selections identifying one or more pixels within a threshold distance of one or more respective selection epicenters and a corresponding respective gradient specifying a likelihood that the one or more pixels are within the threshold distance.

22. A method for interactive image segmentation, the method comprising:
 executing an inception sublayer of a convolutional neural network (CNN) including two or more inception-atrous-collation (IAC) layers, the inception sublayer including two or more convolutions including respective kernels of varying sizes to generate multi-scale inception features, the inception sublayer to receive one or more context features indicative of user input;
 executing an atrous sublayer of the CNN, the atrous sublayer including two or more atrous convolutions including respective kernels of varying sizes to generate multi-scale atrous features; and
 executing a collation sublayer of the CNN to collate the multi-scale inception features, the multi-scale atrous features, and eidetic memory features.

23. The method of claim 22, further including bypassing the inception sublayer in response to determining that bypassing the inception sublayer would be advantageous to the CNN.

24. The method of claim 23, further including bypassing the inception sublayer to preserve data in one or more input feature matrices to the inception sublayer.

25. The method of claim 22, further including bypassing the atrous sublayer in response to determining that bypassing the atrous sublayer would be advantageous to the CNN.

\* \* \* \* \*